(12) United States Patent
Taylor et al.

(10) Patent No.: US 9,808,720 B2
(45) Date of Patent: Nov. 7, 2017

(54) SYSTEMS AND METHODS FOR DYNAMIC BASE DEVELOPMENT IN A THREE DIMENSIONAL ACTION GAME

(71) Applicant: Glu Mobile, Inc., San Francisco, CA (US)

(72) Inventors: Jesse Taylor, San Francisco, CA (US); Jason Estebez, Oakland, CA (US); Constantine Hantzopoulos, San Francisco, CA (US); Michael McHale, San Mateo, CA (US)

(73) Assignee: Glu Mobile, Inc., San Francisco, CA (US)

( * ) Notice: Subject to any disclaimer, the term of this patent is extended or adjusted under 35 U.S.C. 154(b) by 0 days.

(21) Appl. No.: 14/639,957

(22) Filed: Mar. 5, 2015

(65) Prior Publication Data

US 2015/0265927 A1   Sep. 24, 2015

Related U.S. Application Data

(60) Provisional application No. 61/948,022, filed on Mar. 5, 2014.

(51) Int. Cl.
*A63F 13/12* (2006.01)
*A63F 13/69* (2014.01)
(Continued)

(52) U.S. Cl.
CPC .............. *A63F 13/69* (2014.09); *A63F 13/30* (2014.09); *A63F 13/822* (2014.09); *A63F 13/837* (2014.09)

(58) Field of Classification Search
CPC ........ A63F 13/69; A63F 13/822; A63F 13/837
(Continued)

(56) References Cited

U.S. PATENT DOCUMENTS 8,926,428 B1 * 1/2015 Nakayama .............. A63F 13/87
463/31
2001/0029203 A1 10/2001 Shoji et al.
(Continued)

OTHER PUBLICATIONS

Starcraft II Wings of Liberty Multiplayer Guide, pp. 1-53, Shockwave Review Aug. 20, 2010, https://www.gamefaqs.com/pc/939643-starcraft-ii-wings-of-liberty/faqs/60593.*
(Continued)

*Primary Examiner* — David L Lewis
*Assistant Examiner* — Shauna-Kay Hall
(74) *Attorney, Agent, or Firm* — Morgan, Lewis & Bockius LLP

(57) ABSTRACT

Systems and methods for hosting a game are disclosed in which a user is granted a first base comprising a three-dimensional section with a base target. Game credit is earned through successful completion of campaigns in which the user, posed as an avatar, fights against a plurality of defendants of a second base in a three dimensional action format in which the avatar and the plurality of defendants use weapons against each other. The user is provided with a description of base upgrades, including three-dimensional pre-fabricated sections that can be dynamically added to the first base, and associated costs for the upgrades. Upon selection a base upgrade, the associated cost of the selected upgrade is deducted from the game credit accrued by the user. The first base is augmented with the selected base upgrade thereby augmenting a defense of the first base.

30 Claims, 32 Drawing Sheets

(51) Int. Cl.
*A63F 13/822* (2014.01)
*A63F 13/837* (2014.01)
*A63F 13/30* (2014.01)

(58) Field of Classification Search
USPC .......................................................... 463/31
See application file for complete search history.

(56) References Cited

U.S. PATENT DOCUMENTS

| | | | |
|---|---|---|---|
| 2009/0181770 A1 | 7/2009 | Viner et al. | |
| 2010/0066736 A1 | 3/2010 | Nishimura et al. | |
| 2010/0311483 A1 | 12/2010 | Fields et al. | |
| 2012/0248699 A1* | 10/2012 | Garcia | A63F 3/0052 273/242 |
| 2013/0190090 A1 | 7/2013 | Lin et al. | |
| 2014/0066191 A1* | 3/2014 | Yang | A63F 13/10 463/29 |
| 2014/0164142 A1* | 6/2014 | Yang | G06Q 30/0273 705/14.69 |
| 2015/0051001 A1* | 2/2015 | Linden | A63F 13/87 463/42 |

OTHER PUBLICATIONS

StarCraft 2 Guide, pp. 1-136, IGN Entertainment Inc. 2010, http://www.bazicenter.com/features/starcraft2_ignpdf.pdf.*
StarCraft II Wings of Liberty—Terran Race, pp. 1-23, http://us.battle.net/sc2/en/game/.*
Sol Survivor Tower Defense Game, pp. 1-16, www.co-optimus.com/review/313/page/1/sol-survivor-co-op-review.html.*
StarCraft Game Manual, pp. 1-98, Blizzard Entertainment, www.replacementdocs.com.*
starcraft2_ignpdf.pdf, pp. 1-136, IGN Entertainment.*
StarCraft II Wings of Liberty Multiplayer Game Guide for PC, pp. 1-53, https://www.gamefaqs.com/pc/939643-starcraft-ii-wings-of-liberty/faqs/60593.*
International Search Report for International Patent Application No. PCT/US2015/019061, dated Jun. 4, 2015, 3 pages.
Lewis, J.M. et al., 2011, "A Corpus of Strategy Video Game Play in Starcraft: Brood War" CogSc. pp. 687-692.
Synnaeve, G., 2011 "A Bayesian Model for Opening Prediction in RTS Games with Application to StarCraft" IEEE Conference on Computational Intelligence and Games, pp. 281-288.

* cited by examiner

SYSTEMS AND METHODS FOR DYNAMIC BASE DEVELOPMENT IN A THREE DIMENSIONAL ACTION GAME

CROSS REFERENCE TO RELATED APPLICATION

This application claims priority to U.S. Provisional Application No. 61/948,022, entitled "Systems and Methods for Dynamic Base Development in a Three Dimensional Shooting Game," filed Mar. 5, 2014, which is hereby incorporated by reference herein in its entirety.

TECHNICAL FIELD

The disclosed implementations relate generally to dynamic base building and defense in a three dimensional action game.

BACKGROUND

Two dimensional strategy games that permit limited base building functionality exist. Notable among these strategy games is Clash of Clans (SUPERCELL). Clash of Clans is a strategy game where players construct and expand villages, unlock successively more powerful warriors and defenses, raid and pillage resources from other villages, and create and join clans. Another two dimensional strategy game is Kingdoms of Camelot (KABAM, San Francisco, Calif.), in which users manage resources, trains troops and build weapons in an overall quest to acquire more cities for the Kingdom. The drawback with such two dimensional strategy games is the two dimensional nature of the combat. Rather than provide a rich three dimensional combat in which a user can shoot or throw a weapon into three dimensional space, combat is limited to two dimensions.

Given the above background, what is needed in the art is a new genre of video games that overcome the above-identified deficiencies in existing video games.

SUMMARY

The present disclosure addresses the above-identified need in the art by providing a third-person, three-dimensional action game, coupled with dynamic base development. Some embodiments of the present disclosure present a game that comprises a plurality of layers. One layer is a series of rooms or constructions that are connected dynamically, by a user, rather than by the game manufacturer, to form a base. Another layer is the ability for the user to place and augment defenses inside these bases. Thus, the user has the ability to decide what gets placed in the bases. As the game progresses, the user can revise what is placed in the bases, or the bases themselves, so that the base defenses become increasingly harder to overcome.

With that overview, in some embodiments of the present disclosure, a user is able to build their own base as part of the competitive portion of a three-dimensional action game. The user, for instance upon successful completion of campaigns or other forms of challenges, selects three-dimensional sections or other forms of defense upgrades on a dynamic basis for their three-dimensional base. In some implementations, a base is a series of three dimensional elements. For instance, it may have a parking lot out front, one or more warehouse spaces, one or more laboratories, an armory, passageways, and an office, which are all interconnected to each other in a dynamic fashion by the user.

The object of the game for the user, when acting as a defender, is to build one or more bases that cannot be comprised by other users. The object of the game for the user, when acting as an infiltrator, is to infiltrate such bases built by other users. A base is deemed to be infiltrated when a base target associated with the base has been compromised. By way of example, in some embodiments, the base target is a henchman in the office of the base and the infiltrator user works their way back to the henchman in the base and neutralizes the henchman in order to infiltrate the base. In some embodiments, the henchman is in the base lair, the final room. What distinguishes a henchmen over armed guards in the base is that, typically, a henchman has unique play patterns, whereas the actions of guards is typically limited to getting behind cover, ducking up, taking a limited set of gunshots, maybe stepping out, and taking a few gunshots. In contrast, a henchman has a higher level of fidelity and will perform more actions. For example, in some embodiments, a henchman will wield twin machine guns and/or will have a jet pack enabling him to fly.

In general, in game play in the disclosed embodiments, the player, acting as an infiltrator, tries to get as far into the base as possible whereas, for the user constructing and defending the base, the goal is to make a base as impenetrable as possible by putting up defenses in the base. By implementing these objectives in a three-dimensional action video game, the deficiencies in known games are overcome.

In further detail, an aspect of the present disclosure provides a non-transitory computer readable storage medium for playing a video game. The non-transitory computer readable storage medium is stored on a computing device. The computing device comprises one or more processors and memory storing one or more programs for execution by the one or more processors. The one or more programs singularly or collectively comprise instructions for granting to a first user a first base comprising a first three-dimensional section with a first base target. A first mechanism by which the first user earns game credit (e.g., through successful completion of one or more campaigns within the game or by money purchase) is further provided. A first campaign in the one or more campaigns poses an avatar of the first user against a plurality of defendants of a second base in a three dimensional action shooting format in which the avatar and the plurality of defendants are adverse to each other and fire weapons at each other. The avatar is able to fire a weapon in three dimensions during a campaign. As the video game progresses, the first user is further provided with a description of a plurality of base upgrades for the first base and a cost associated with each base upgrade in the plurality of base upgrades. A selection is received, from the first user, of a first base upgrade from the plurality of base upgrades. The associated cost of the first base upgrade is deducted from the game credit associated with the first user. The first base is augmented with the first base upgrade thereby augmenting a defense of the first base target.

In some embodiments, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base. In some embodiments, there is a plurality of ways in which the first base upgrade is dynamically fused to the first base and the first user selects a way of fusing the first base upgrade to the first base from among the plurality of ways. Examples of a first base upgrade include, but are not limited to, a parking lot, a vehicle garage, a warehouse space, a laboratory, an armory, a passageway, an office, or a missile silo. In some embodiments, the first base upgrade is a room and the fusing results in a doorway between the first three-dimensional section and the room.

In some embodiments, the plurality of base upgrades comprises a plurality of defenses, and the first base upgrade is selected from the plurality of defenses. Examples of such defenses include, but are not limited to, an armed guard, a security camera, a sentry gun, a trip wire, a razor-wire fence, an alarm system, a gun turret, a booby trap, an explosive barrel, a wild animal, a metal detector, a laser beam, or a sentry bot.

In some embodiments, a base upgrade in the plurality of base upgrades comprises an upgrade in a characteristic of (e.g., skill level, ability to shoot, health level, damage creating capability) of an armed guard associated with the first base. In one example, in the case where the base upgrade is for an armed guard, there may exist deficient armed guards or really good armed guards, where deficient guards are slow, lazy and armed with just revolvers, whereas good armed guards are wearing SWAT outfits and carrying assault rifles. In this example, the base upgrade would be switching out one or more deficient guards for one or more good armed guards to defend the base.

In some embodiments, a first user earns some game credit simply for playing campaigns, whether these campaigns are deemed successful (e.g., neutralizing a base target within a predetermined time period) or not. In some embodiments, a first user earns some game credit simply for playing campaigns, whether these campaigns are deemed successful (e.g., neutralizing a base target within a predetermined time prior) or not, but earns more game credit when successfully completing a campaign.

In some embodiments, the first mechanism by which a first user earns game credit is configured to be repeated by the first user, thereby allowing the first user to earn sufficient game credit to select more than one base upgrade from the plurality of upgrades. In some embodiments, the first mechanism by which the first user earns game credit is configured to be repeated by the first user, thereby allowing the first user to earn sufficient game credit to select more valuable base upgrades from among the plurality of base upgrades.

In some embodiments, the first user is associated with a first game level and the first mechanism by which the first user earns the game credit is configured to advance the first user from the first game level to progressively more difficult (e.g., "higher") game levels, and a composition of the plurality of base upgrades is a function of the game level associated with the first user. As an example, in some embodiments, as the first user progresses to higher game levels, the first user is given access to progressively more powerful defenses for selection. In some embodiments, the plurality of base upgrades offered to the first user for selection are more effective at protecting the first base target when the first user is associated with a more advanced game level.

In some embodiments, the one or more programs further singularly or collectively include instructions for allowing the first user to challenge a second user or the computing device to infiltrate the first user's base. In such embodiments, when the second user or the computing device is unable to compromise the first base target of the first user's base, the first user is granted game credit applicable for one or more of the base upgrades in the plurality of base upgrades or other virtual items of value to the user. In some embodiments, the second user or computing device is deemed to have been unable to infiltrate the first user's base when the second user or the computing device is unable to compromise the first base target of the first user's base prior to being terminated. In some embodiments, the second user or computing device is deemed to have been unable to infiltrate the first user's base when the second user or the computing device is unable to compromise the first base target of the first user's base before a predetermined amount of time has elapsed (e.g., the base must be infiltrated within five minutes in some embodiments or it is deemed to have not been infiltrated.)

In some embodiments, the one or more programs further singularly or collectively include instructions for providing a second mechanism by which the first user earns game credit through monetary compensation. In other words, rather than and/or in addition to infiltrating bases to earn game credit, the first user pays money for game credit.

In some embodiments, the first user can build more than one base. Thus, in one aspect of the present disclosure, the one or more programs further singularly or collectively include instructions for allowing the first user to build a second or subsequent base comprising a second or subsequent three-dimensional section with a second base target in a single gaming session or across multiple gaming sections, where such bases are stored between gaming sessions for subsequent use. Further, as the game progresses, the user is able to dynamically add three-dimensional sections to any of these additional bases subject to the constraint of the user's game credit. Thus, in some embodiments of the present disclosure, the one or more programs further singularly or collectively include instructions for allowing the first user to build and store a plurality of bases, with each base in the plurality of bases comprising a corresponding three-dimensional section and a corresponding base target.

In some embodiments, the first base target is a henchman uniquely associated with the first base.

In some specific embodiments, the first mechanism by which the first user earns game credit is configured to be repeated by the user, thereby allowing the first user to earn sufficient game credit to select more than one base upgrade from the plurality of upgrades over time, and furthermore, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base. In these specific embodiments, the plurality of base upgrades further comprises a plurality of defenses, and a second base upgrade selected by the first user for the first base is selected from the plurality of defenses. In other words, in some embodiments, the first user selects both a three-dimensional pre-fabricated section and a defense in order to upgrade the defense of the first base, in exchange for base credit.

In some embodiments, the one or more programs further singularly or collectively include instructions for providing a base editor that permits the first user to dynamically rebuild the first base from among the plurality of base upgrades, subject to the constraints of the game credit associated with the first user.

In some embodiments, the plurality of base upgrades includes one or more three-dimensional pre-fabricated sections and one or more defenses.

In some embodiments, the avatar is subject to termination in a campaign when shot a predetermined number of times by the plurality of defendants and, when terminated, the first user does not earn game credit for the campaign. In some embodiments, a campaign in the one or more campaigns requires the avatar to neutralize a second base target associated with the second base.

In some embodiments, the one or more campaigns is a plurality of campaigns, each respective campaign in the plurality of campaigns being associated with a different base in a plurality of bases and the first user is able to select from among the plurality of campaigns by the first mechanism in order to attempt to earn game credit.

Another aspect of the present disclosure provides a computing system for playing a video game. The computing system comprises one or more processors and memory storing one or more programs for execution by the one or more processors. The one or more programs singularly or collectively execute a method in which a first user is granted a first base comprising a first three-dimensional section with a first base target. This aspect of the present disclosure provides a first mechanism by which the first user earns game credit through successful completion of one or more campaigns within the game. A first campaign in the one or more campaigns poses an avatar of the first user against a plurality of defendants of a second base in a three dimensional action shooting format in which the avatar and the plurality of defendants are adverse to each other and fire weapons at each other and the avatar has an ability to fire a weapon in three dimensions during a campaign. The first user is provided with a description of a plurality of base upgrades for the first base and a cost associated with each base upgrade in the plurality of base upgrades. Upon receiving a selection, from the first user, of a first base upgrade from the plurality of base upgrades, the cost associated with the first base upgrade is deducted from the game credit associated with the first user and the first base is augmented with the first base upgrade thereby augmenting a defense of the first base target. In some embodiments the computing system is a server and the first user interacts with the game using a first client device that remotely interacts with the server. In some embodiments, the one or more programs further singularly or collectively include instructions for allowing the first user to challenge a second user or the computing system to infiltrate the first user's base and, when the second user or the computing system is unable to compromise the first base target of the first user's base, the first user is granted game credit applicable for one or more of the base upgrades in the plurality of base upgrades.

In some embodiments, the first user interacts with the game using a first client device that remotely interacts with the server, and the second user interacts with the game using a second client device that remotely interacts with the server. In some embodiments, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base. In some embodiments, the plurality of base upgrades comprises defenses such as armed guards, obstacles, security doors, and cameras booby traps and the augmenting allows the user to position such defenses within the first base. In some embodiments, the first mechanism by which the first user earns game credit is configured to be repeated by the user, thereby allowing the first user to earn sufficient game credit to select more than one base upgrade from the plurality of upgrades over time, and the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base, the plurality of base upgrades further comprises a plurality of defenses, and a second base upgrade selected by the first user for the first base is selected from the plurality of defenses.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

Like reference numerals refer to corresponding parts throughout the several views of the drawings.

DETAILED DESCRIPTION

Disclosed are systems and methods for hosting a game in which each user (player) is granted a first base that comprises a three-dimensional section with a base target. Game credit is earned through successful completion of campaigns in which a user, posed as an avatar, fights against multiple defendants of a second base in a three dimensional action format in which the avatar and the plurality of defendants use weapons against each other. That is, the user, posed as the avatar, infiltrates the second base using three-dimensional control over scenery in the second base. The user is provided with a description of base upgrades, including three-dimensional pre-fabricated sections that can be dynamically added to the first base, and associated costs for the upgrades. Upon selection of a base upgrade, the associated cost of the selected upgrade is deducted from the game credit accrued by the user. The first base is augmented with the selected base upgrade thereby augmenting a defense of the first base. As the game progresses, the user can build more than one base. Furthermore, as the game progresses, the user can acquire more advanced items (e.g., weapons) or upgrade item characteristics (e.g., recoil power, range, accuracy, critical hit chance, reload time, ammunition clip size, critical damage multiplier, etc.).

Additional details of implementations are now described in relation to the Figures.

Figure 1:
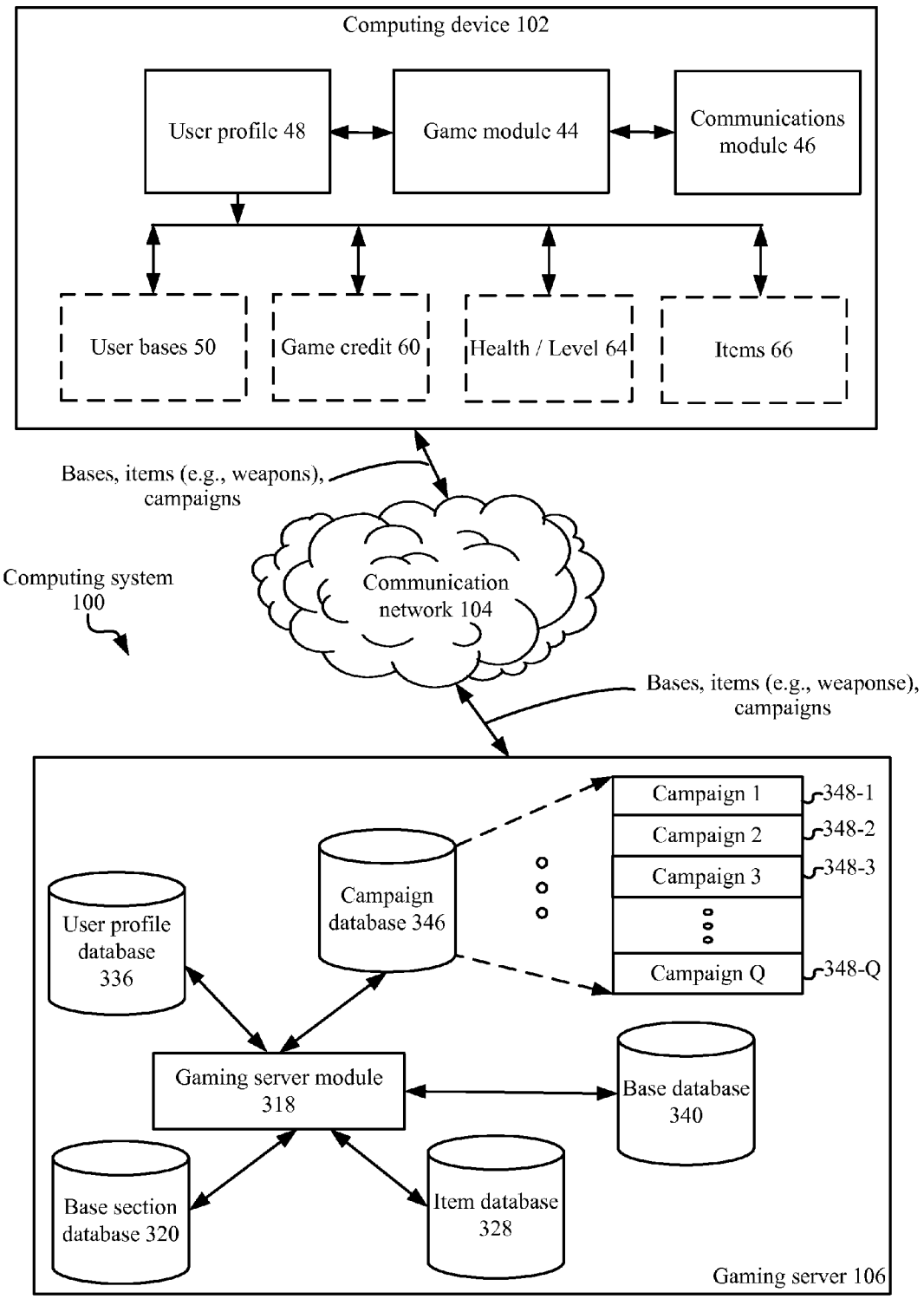
FIG. 1 is an example block diagram illustrating a computing system, in accordance with some implementations of the present disclosure.

FIG. 1 is a block diagram illustrating a computing system 100, in accordance with some implementations. In some implementations, the computing system 100 includes one or more computing devices 102 (e.g., computing devices 102A, 102B, 102C, 102D . . . , and 102N), a communication network 104, and one or more gaming server systems 106. In some implementations, a computing device 102 is a phone (mobile or landline, smart phone or otherwise), a tablet, a computer (mobile or otherwise), or a hands free computing device.

In some implementations, a computing device 102 is used within a game to provide a user with a base comprising a first three-dimensional section with a base target. In some embodiments, the computing device 102 provides a mechanism by which the user earns game credit through successful completion of one or more campaigns within the game. In these campaigns, an avatar of the first user is posed against multiple defendants of a base not associated with the user. For instance, in some embodiments the base is associated with another user. The user infiltrates the opposing base in a three dimensional action format in which the avatar and the base defendants are adverse to each other and use weapons against each other. Advantageously, in some embodiments the avatar has an ability to fire a weapon in three dimensions, and explore the base in three dimensions, during such campaigns. Advantageously, in other embodiments the avatar has an ability to swing a weapon (e.g., a sword or knife) in three dimensions, and explore the base in three dimensions, during such campaigns. Successful completion of campaigns leads to the award of game credit to the user. The user has the option to use such game credit to buy better items (e.g., weapons) or upgrade the characteristics of existing items. This allows the user to infiltrate enemy bases with greater ease. In some embodiments, the user has the option to use such game credit to buy base upgrades so that the user's bases are harder to infiltrate by other players. In this regard, computing device 102 provides the user with a description of a plurality of base upgrades for the base and a cost associated with each base upgrade in the plurality of base upgrades. When the user selects a base upgrade, the associated cost of the first base upgrade is deducted from the user's game credit and the user's base is augmented with the base upgrade thereby improving the defense of the base target associated with the user' base.

In some implementations, the computing device 102 includes a game module 44 that facilitates the above identified actions. In some implementations, the computing device 102 also includes a user profile 48. The user profile 48 stores characteristics of the user such as details of the user bases 50 the user has built, game credit 60 that the user has acquired, the health of the user in a given campaign and the level 64 that the user has acquired through successful base defense and/or successful campaign completions, and the items (e.g., weapons, armor, etc.) 66 that the user has acquired. In some implementations, the computing device 102 also includes a communications module 46. The communications module 46 is used to communicate with gaming server 106, for instance, to acquire additional campaigns, look up available base upgrades, report game credit, identify available base components, and to lookup available items or item characteristics.

In some implementations, the communication network 104 interconnects one or more computing devices 102 with each other, and with the gaming server system 106. In some implementations, the communication network 104 optionally includes the Internet, one or more local area networks (LANs), one or more wide area networks (WANs), other types of networks, or a combination of such networks.

In some implementations, the gaming server system 106 includes a gaming server module 318, a user profile database 336, a campaign database 346 comprising a plurality of campaigns 348, a base database 340, an item database 328, and/or a base section database 320. In some embodiments, the gaming server module 318, through the game module 44, provides players (users) with campaigns 348. Typically, a campaign 348 challenges a user to infiltrate a base. Advantageously, the gaming server module 318 can draw from any of the bases in base database 340 to build campaigns 348. In some embodiments, as each player progresses in the game, they improve their initial starting bases. In some embodiments, bases are scored based on the quality of their defenses and these scores are used to select which bases are used in the campaigns offered by gaming server module 318 to any given player. The goal is to match the quality of base defenses to the skill level of a given player so that the given player is appropriately challenged and is motivated to continue game play. Thus, in some embodiments, the scores of the bases associated with campaigns offered to a given user match the skill level of the user. As the user successfully completes campaigns, their skill level advances. In some embodiments, gaming server module 318 allows the user to select campaigns 348 that require infiltration of bases built by a specific user. Such embodiments are advantageous because they allow for users to attempt infiltration of specific bases made by users they want to challenge. For example, if user A keeps having his bases infiltrated by user B, user A may return the favor by choosing campaigns that involve infiltration of bases built by user B. In another example, users A and B may be friends and user A may tell user B about a base he has built and challenge user B to try and infiltrate the base. In this example, user B takes up user A's challenge by selecting a campaign 348 that requires infiltration of the base that user A built.

In some embodiments, the campaign database 346 is used to store the campaigns 348 that may be offered by the gaming server module 318. In some embodiments, some or all of the campaigns 348 in the campaign database 346 are system created rather than user created. This provides a measure of quality control, by ensuring a good spectrum of bases of varying degrees of difficulty. In this way, there are campaigns 348 available for both beginners and more advanced users.

As referenced above, in some embodiments, the base database 340 stores a description of each of the bases that are provided by the system. In some embodiments, at least some of the bases stored in the base database 340 are made by players of the game. In some embodiments, at least some of the bases stored in the base database 340 are made by players of the game and at least some of the bases are prebuilt and are provided with the game. The purpose of such prebuilt bases, as described above, is to ensure that there is a good spectrum of bases for each player tier, or skill level. In some embodiments each base has, at a minimum, a base target. The base target represents the aspect of the base that must be compromised in order to infiltrate the base. In some embodiments, the base target is the location of a special henchman that is uniquely associated with a base. The henchman runs the base and is the lead character of the base. In some embodiments, killing the henchman is required to compromise the base. In some embodiments, each base further has at least one three-dimensional section. A three-dimensional section can be manipulated in three dimensions by users as they traverse through the section. More specifically, an avatar of the user traverses through the three-dimensional section when attempting to infiltrate the base. The avatar is given sufficient viewing controls to view the three-dimensional section in three dimensions. For example, in some embodiments, the three dimensions are depth, left-right, and up-down. In typical embodiments, the user is not wearing stereo-glasses and thus must use traverse controls (to walk into the section), left-right controls, and up-down controls to explore all aspect of the three-dimensional section. Examples of the possible three-dimensional sections associated with a base include, but are not limited to, a parking lot, a vehicle garage, a warehouse space, a laboratory, an armory, a passageway, an office, and/or a missile silo. In typical embodiments, a base stored in base database 340 has more than one three-dimensional section, and each of the three-dimensional sections of a base are interconnected with at least one other three-dimensional section of the base by a passageway (e.g., doorway, elevator, window, tunnel, pathway, walkway, etc.). In some embodiments, the user who built the base can combine three-dimensional sections dynamically. For instance, in some embodiments, a first three-dimensional section of a base has two or more entryways and the user combines a new three-dimensional section to the first three-dimensional section by any one of the two or more entryways that have not already been combined with another section of the base. In some embodiments, each base has at least one three-dimensional section, at least two three-dimensional sections, at least three three-dimensional sections, at least four three-dimensional sections, or at least five three-dimensional sections. In some embodiments, each three-dimensional section in a base is connected to at least one other three-dimensional section in the base. In some embodiments, a three-dimensional section in a base is connected to at least two other three-dimensional sections in the base. In some embodiments, a three-dimensional section in a base is connected to at least three other three-dimensional sections in the base.

Each game user is provided with one or more items (e.g., weapons, armor, food, potions, etc.) to use in the campaigns 348. In some embodiments, a user may purchase item upgrades or new items altogether. In some embodiments, a user may not purchase item upgrades or new items altogether but may acquire such upgrades and new items by earning game credit through the successful completion of one or more of the campaigns 348. In some embodiments, a user may not purchase item upgrades or new items altogether but may acquire such upgrades and new items by earning game credit through both successful and unsuccessful completion of one or more of the campaigns 348.

In some embodiments, the gaming server module 318 provides users with an interface for acquiring items (e.g. weapon) upgrades or new items. In some embodiments, the gaming server module 318 uses the item database 328 to track which items and which item upgrades (item characteristics) are supported by the game. In some embodiments, the items database 328 provides categories of items and the user first selects an item category and then an item in the selected item category. In the case where the items include weapons, exemplary weapons categories include, but are not limited to assault rifles, sniper rifles, shotguns, Tesla rifles, grenades, and knife-packs.

In some embodiments, users of the video game are ranked into tiers. In one example, tier 1 is a beginner level whereas tier 10 represents the most advanced level. Users begin at an initial tier (e.g., tier 1) and as they successfully complete campaigns 348 their tier level advances (e.g., to tier 2 and so forth). In some such embodiments, the weapons available to users in each item category are a function of their tier level. In this way, as the user advances to more advanced tiers, more advanced items are unlocked in item database 328 and thus made available to the user. For example, in some embodiments, in the assault rifles category, at the tier 1 level, item database 328 provides a Commando XM-7, a Raptor Mar-21, and a Viper X-72. In some embodiments, in the sniper rifles category, at the tier 1 level, item database 328 provides a Scout M390, a Talon SR-9, and a Ranger 338LM. In some embodiments, in the shotguns category, at the tier 1 level, item database 328 provides a SWAT 1200, a Tactical 871, and a Defender. In some embodiments, in the Tesla rifles category, at the tier 1 level, item database 328 provides an M-25 Terminator, a Tesla Rifle 2, and a Tesla Rifle 3. In some embodiments, the item database 328 further provides grenades (e.g., frag grenades for damaging groups of enemies crowded together and flushing out enemies hiding behind doors or corners) and knife-packs. In some embodiments, the item database further provides magic spells, potions, recipes, bombs, food, cloths, vehicles, space ships, and/or medicinal items. In some embodiments, the characteristics of these items are tiered. For example, in some embodiments, where an item is a weapon, the accuracy of a weapon may be upgraded to a certain point, the point being determined by the user's tier level.

In some embodiments, the components (base sections) and defenses that a player may add to a base are stored in the base section database 320. Thus, a player wishing to augment a base may select from some or all of the base sections stored in the base section database 320. In some embodiments, the base sections are tiered and only those base sections at the player's current tier level, or lower, are available to the player. Examples of base sections include, but are not limited to a parking lot, a vehicle garage, a warehouse space, a laboratory, an armory, a passageway, an office and/or a missile silo. In some embodiments, the base section database 320 further provides base defenses that may be placed in any of the sections of a base. Examples of such defenses include, but are not limited to armed guards, security cameras, sentry guns, trip wires, razor-wire fences, alarm systems, gun turrets, booby traps, explosive barrels, wild animals, metal detectors, laser beams, sentry bots and/or hidden passageways. Thus, in addition to or instead of adding additional sections to a base, a player may augment the base with defenses. In some embodiments, such defenses are tiered and only those defenses that are at the player's tier level, or lower, are available to the player for base building. In some embodiments, the capabilities of such defenses are tiered and only those capabilities (e.g., armed guard firing rate, armed guard firepower, armed guard reload rate) that are at the player's tier level, or lower, are available to the player for base building. Moreover, in addition to this tiered requirement, in typical embodiments, each base section, each defense, and each defense capability costs a predetermined associated amount of game credit to acquire that varies depending on the base section, defense, or defense capability. Thus, in addition to having the correct tier level, a player must also have sufficient game credit to acquire base sections and/or base defenses and/or defense capabilities. In some embodiments, such game credit is only acquired by successful completion of one or more campaigns 348. In some embodiments, such game credit is only acquired by successful or unsuccessful completion of one or more campaigns 348. In instances where game credit is given for an unsuccessful campaign, the amount of game credit is typically less than the amount of game credit that would be awarded for a corresponding successful completion of the campaign. In some embodiments, such game credit is acquired by successful completion of one or more campaigns 348 and/or the purchase of game credit (e.g., purchasing game credit with PAYPAL or by credit card, etc.). In some embodiments, such game credit is acquired by successful or unsuccessful completion of one or more campaigns 348 and/or the purchase of game credit (e.g., purchasing game credit with PAYPAL or by credit card, etc.).

In some embodiments, gaming server module 318 maintains a profile in the user profile database 336 of each user playing the game on a computing device 102. In some embodiments, there are hundreds, thousands, tens of thousands or more users playing instances of the game on corresponding computing devices 102 and a gaming server module 318 stores a profile for each such user in user profile database 336. In some embodiments, the user profile database 336 does not store an actual identity of such users, but rather a simple login and password. In some embodiments, the profiles in the user profile database 336 are limited to the logins and passwords of users. In some embodiments, the profiles in user profile database 336 are limited to the logins, passwords, and tier levels of users. In some embodiments, the profiles in user profile database store more information about each user, such as amounts of game credit, types of weapons owned, characteristics of such weapons, and descriptions of the bases built. In some embodiments, rather than storing a full description of each base in a user profile, the user profile contains a link to base database 340 where the user's bases are stored. In this way, the user's bases may be quickly retrieved using the base database 340 link in the user profile. In some embodiments, the user profile in the user profile database 336 includes a limited amount of information whereas a user profile 48 on a computing device 102 associated with the user contains more information. For example, in some embodiments, the user profile in user profile database 336 includes user login and password and game credit acquired whereas the user profile 48 on the computing device 102 for the same user includes information on weapons and bases associated with the user. It will be appreciated that any possible variation of this is possible, with the profile for the user in user profile database 336 including all or any subset of the data associated with the user and the user profile 48 for the user on the corresponding computing device 102 including all or any subset of the data associated with the user. In some embodiments, there is no user profile 48 stored on computing device 102 and the only profile for the user is stored on gaming server 106 in user profile database 336.

Figure 2:
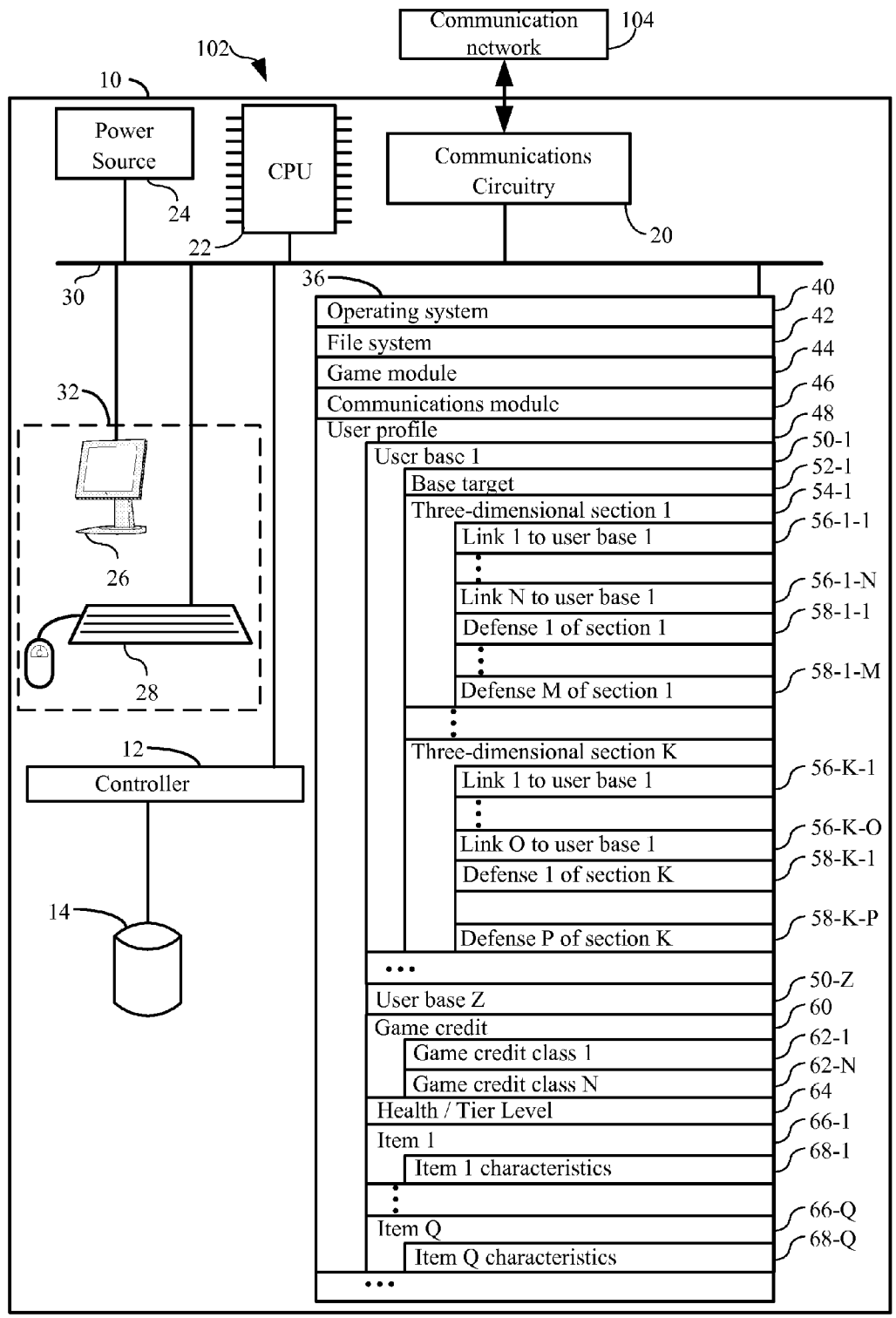
FIG. 2 is an example block diagram illustrating a client computing device, in accordance with some implementations of the present disclosure.

FIG. 2 is an example block diagram illustrating a computing device 102, in accordance with some implementations of the present disclosure. The computing device 102 in some implementations includes one or more processing units CPU(s) 22 (also referred to as processors), one or more network interfaces 20, a user interface 32, a memory 36, and one or more communication buses 30 for interconnecting these components and one or more power sources 24 for powering these components. The communication buses 30 optionally include circuitry (sometimes called a chipset) that interconnects and controls communications between system components. The memory 36 typically includes high-speed random access memory, such as DRAM, SRAM, DDR RAM or other random access solid state memory devices, and optionally includes non-volatile memory 14, such as one or more magnetic disk storage devices, flash memory devices, or other non-volatile solid state storage devices optionally accessed by a controller 12. The memory 36 optionally includes one or more storage devices remotely located from the CPU(s) 22. The memory 36, or alternatively the non-volatile memory device(s) within the memory 36, comprises a non-transitory computer readable storage medium. In some implementations, the memory 36 or alternatively the non-transitory computer readable storage medium stores the following programs, modules and data structures, or a subset thereof:

optionally, an operating system 40, which includes procedures for handling various basic system services and for performing hardware dependent tasks;
  optionally, a file system 42 which may be a component of operating system 40, for managing files stored or accessed by the computing device 102;
  a game module 44 for providing a user access to tools for building bases comprising three-dimensional sections with a base targets and campaigns to infiltrate competitor bases in a three dimensional action format;
  a communications module (or instructions) 46 for connecting the device 102 with other devices (e.g., the gaming server 106 and the devices 102B . . . 102N) via one or more network interfaces 20 (wired or wireless), and/or the communication network 104 (FIG. 1);
  a user profile 48 for tracking the aspects of the user, the user profile 48 including:
    one or more user bases 50 associated with the user, including, for each respective base 50, each component three-dimensional section 54 associated with the respective base and for each component three-dimensional section 54, each link 56 from the component three-dimensional section 54 to another three-dimensional section in the respective base and the defenses 58 of the component three-dimensional section 54;

an accounting of game credit 60, the game credit 60 optionally consisting of more than one class, such as a first game credit class through an N$^{th}$ game credit class, where N is a positive integer greater than one;

a health and/or tier level of the user 64; and one or more items 66 accumulated by the user, and for each such item, the characteristics of the item (e.g., armed guard firing rate, armed guard firepower, armed guard reload rate, in the case where the item is a weapon).

In some implementations, the user interface 32 includes an input device (e.g., a mouse or keyboard 28) for a user to interact with the computing device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 36 optionally stores a subset of the modules and data structures identified above. Furthermore, the memory 36 may store additional modules and data structures not described above.

Figure 3:
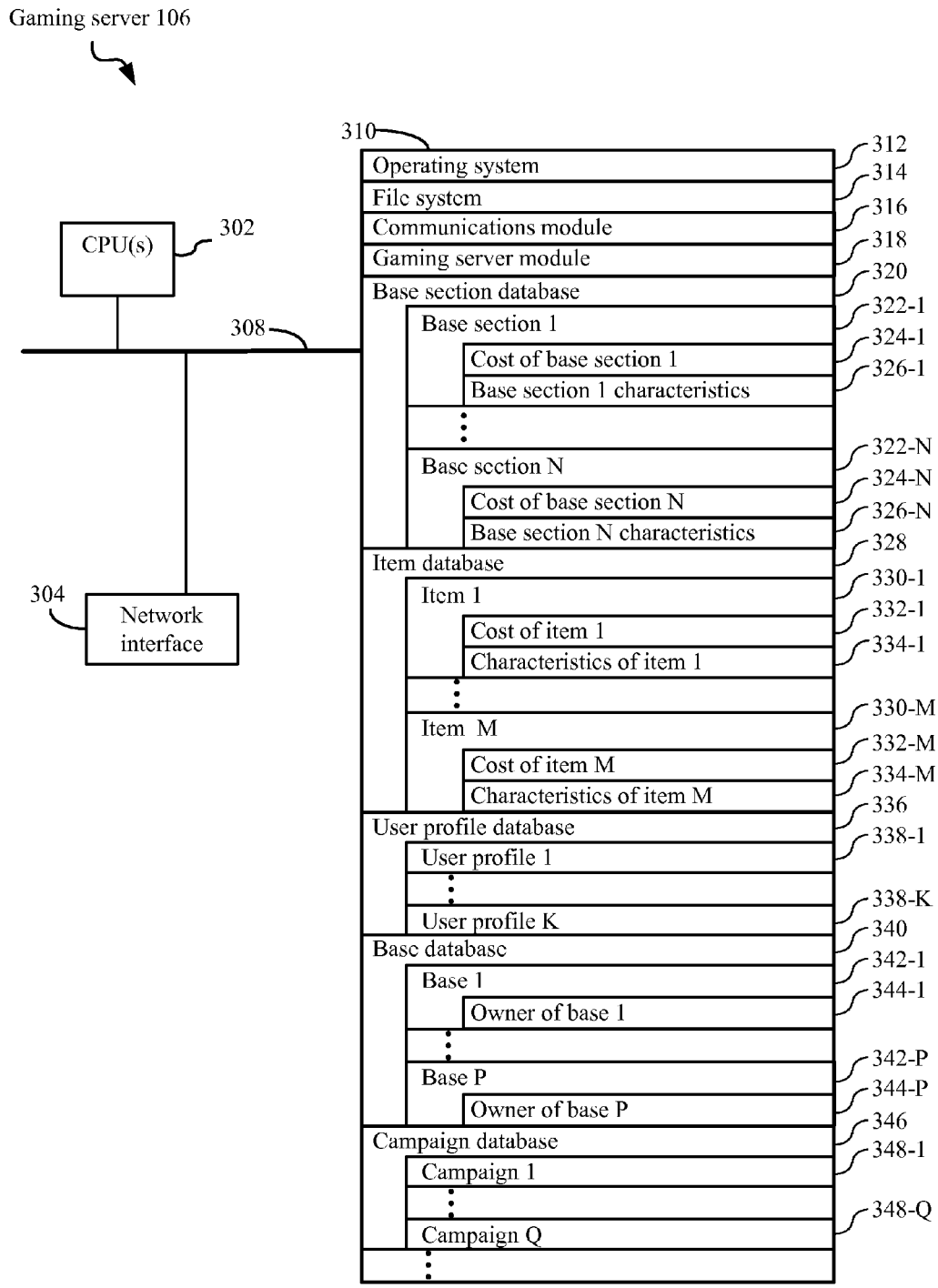
FIG. 3 is an example block diagram illustrating a gaming server, in accordance with some implementations of the present disclosure.

FIG. 3 is an example block diagram illustrating a gaming server 106 in accordance with some implementations of the present disclosure. The gaming server 106 typically includes one or more processing units CPU(s) 302 (also referred to as processors), one or more network interfaces 304, memory 310, and one or more communication buses 308 for interconnecting these components. The communication buses 308 optionally include circuitry (sometimes called a chipset) that interconnects and controls communications between system components. The memory 310 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 310 optionally includes one or more storage devices remotely located from CPU(s) 302. The memory 310, or alternatively the non-volatile memory device(s) within the memory 310, comprises a non-transitory computer readable storage medium. In some implementations, the memory 310 or alternatively the non-transitory computer readable storage medium stores the following programs, modules and data structures, or a subset thereof:

an operating system 312, which includes procedures for handling various basic system services and for performing hardware dependent tasks;

optionally, a file system 314 which may be a component of operating system 312, for managing files stored or accessed by the gaming server 106;

a network communication module (or instructions) 316 for connecting the server 106 with other devices (e.g., the computing devices 102) via the one or more network interfaces 304 (wired or wireless), or the communication network 104 (FIG. 1);

a gaming server module 318 for managing a plurality of instances of game, each instance corresponding to a different participant and each instance supporting a number of campaigns 348, and for tracking user activities within such games;

a base section database 320 for storing the base sections 322 and defenses that a player may add to bases and their associated costs 324 and characteristics 326;

an item database 328 to track the items 330 that are supported by the game as well as the costs 332 of such items and the characteristics 334 of such items;

a user profile database 336 that stores a user profile 338 for each user of the game;

a base database 340 that stores a description of each base 342 that is hosted by the system, including for each such base 342 a representation of the owner 344 of the base; and a campaign database 346 for storing the campaigns 348 that may be offered to the gaming server module 318.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 310 optionally stores a subset of the modules and data structures identified above. Furthermore, the memory 310 may store additional modules and data structures not described above.

Although FIGS. 2 and 3 show a "computing device 102" and a "gaming server 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
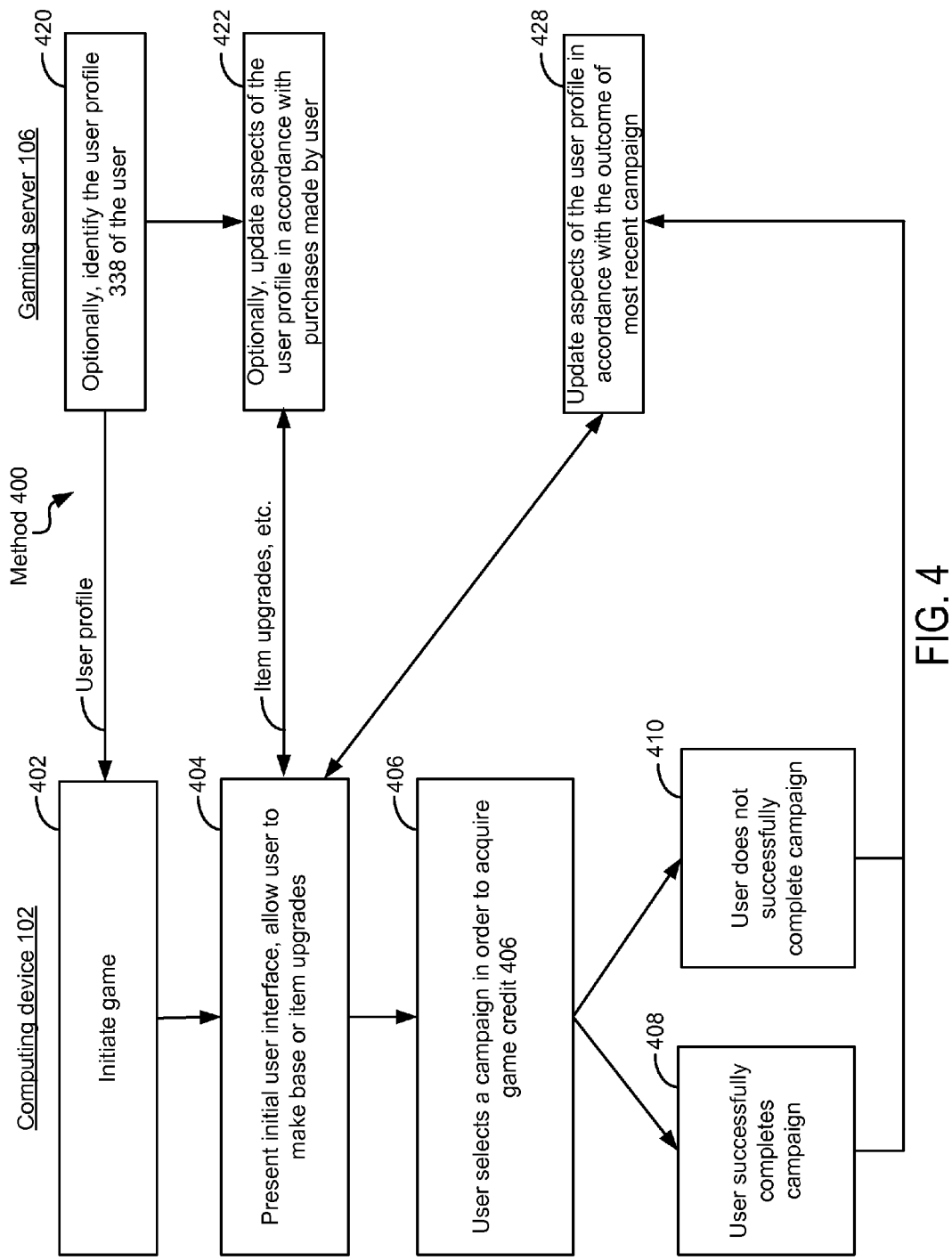
FIG. 4 is an example flow chart illustrating a method for playing a game, in accordance with some implementations of the present disclosure.

FIG. 4 is a flow chart illustrating a method for playing a game, e.g., using a computing device 102 and/or gaming server 106, in accordance with some implementations.

In some implementations, a user initiates 402, at the computing device 102, an instruction to start the video game using the computing device 102A. In response, gaming server 106 obtains the user profile 338 associated with the user who just initiated the video game. In some alternative embodiments (not shown), some or all of the components of the user profile is actually obtained from user profile 48 stored locally on the device 102 rather than obtaining a profile of the user from the server. In still other embodiments, some components of the user profile are obtained from user profile 48 of device 102 whereas other components of the user profile are obtained from the user profile 338.

Figure 6:
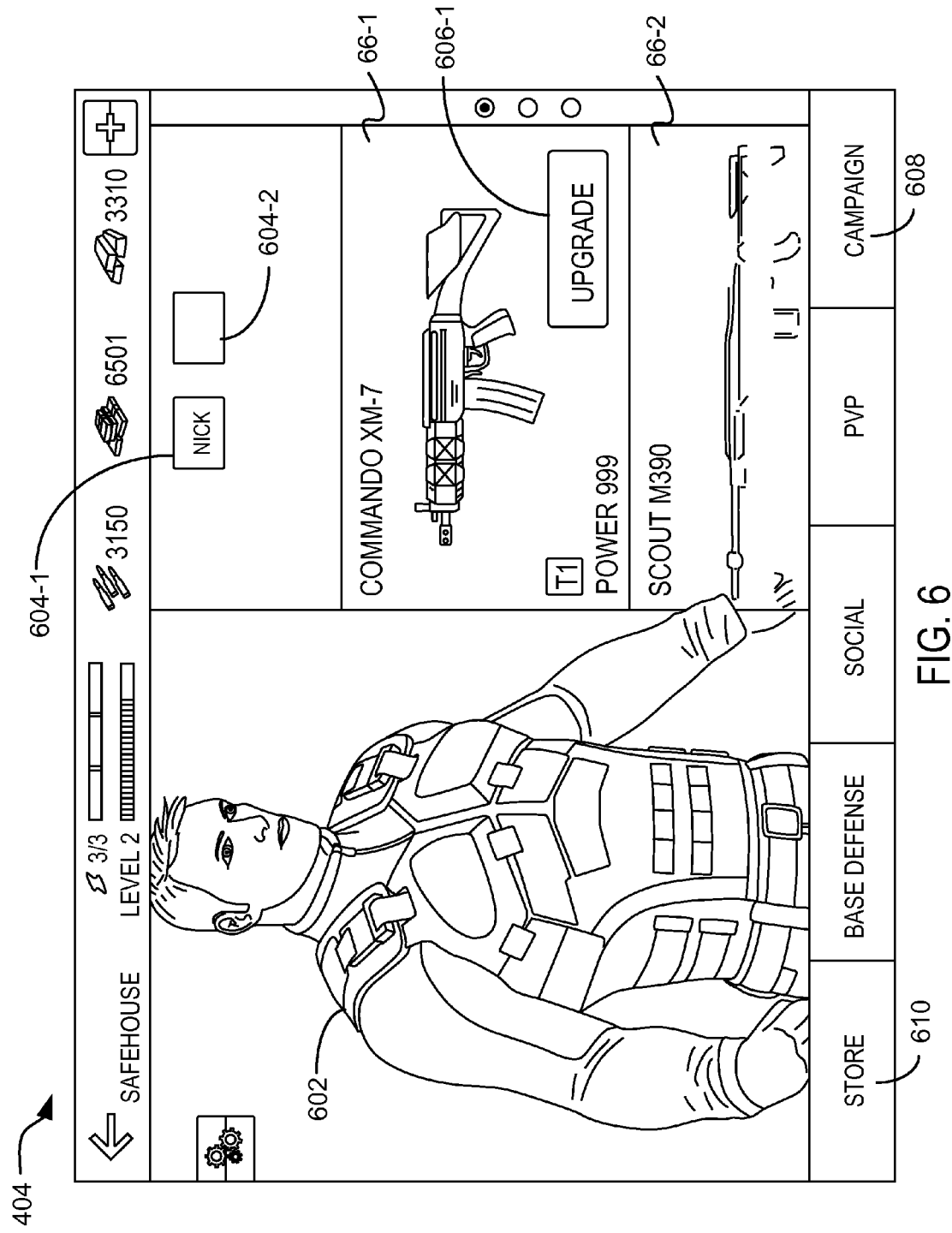
FIG. 6 is a screen image showing an example initial interface, in accordance with an embodiment of the present disclosure.

FIG. 6 provides a screen shot of an example initial interface 404 that is presented to the user via computing device 102 when the user has initiated the game. Referring to FIG. 6, an avatar 602 of the user is depicted. In some embodiments, the user is able to customize characteristics of the avatar 602 and these customizations are stored in the user profile of the user on computing device 102 and/or gaming server 106. In some embodiments the name of the user is displayed 604. When the user selects the name, the user is able designate a title for the name. As illustrated in interface 404 of FIG. 6, multiple names 604 can be associated with a user and, for each such name, a title can be designated. Each such name and title is stored in the user profile.

Figure 7:
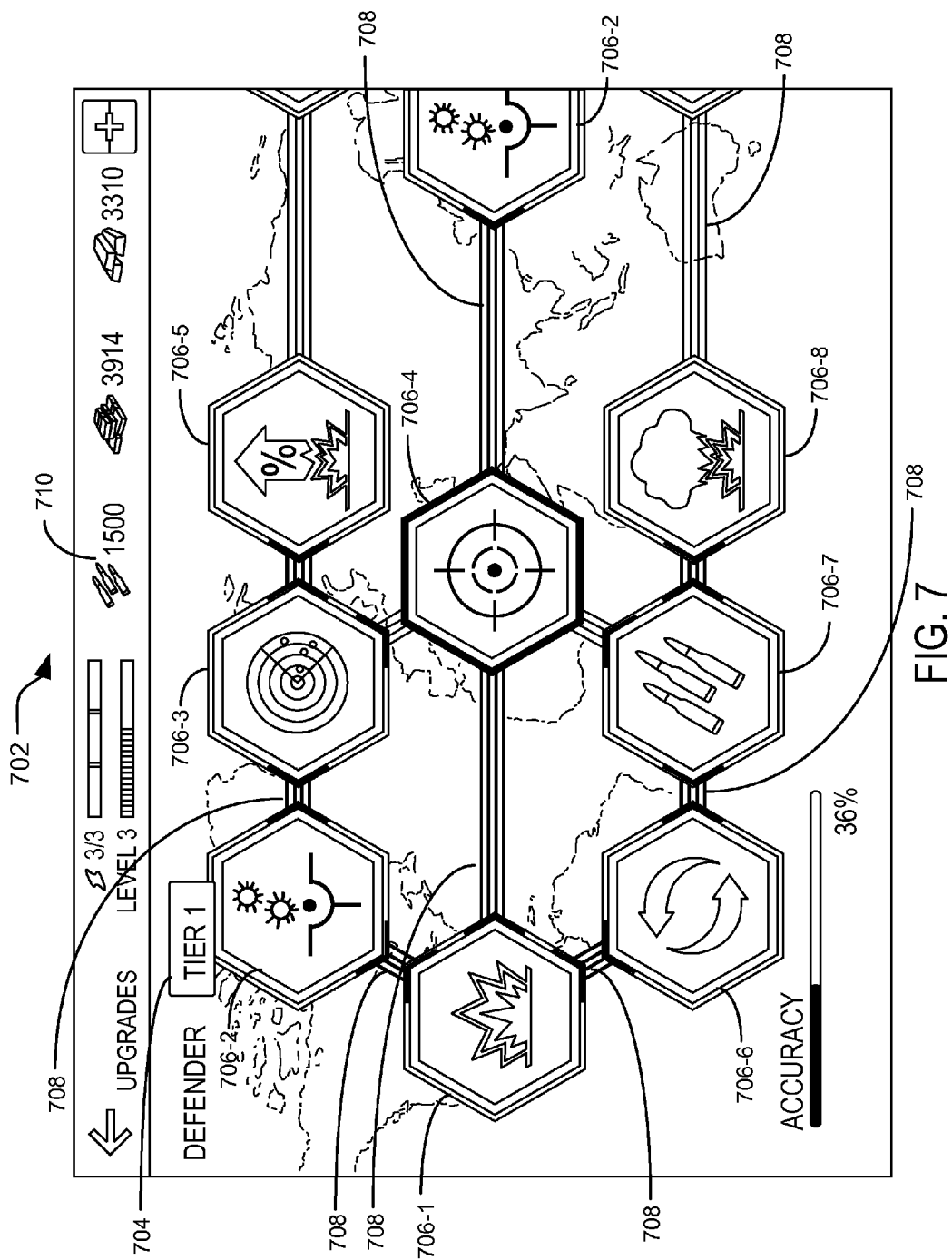
FIGS. 7 and 8 are screen images showing the weapon upgrades available for corresponding weapons, in accordance with an embodiment of the present disclosure.
Figure 8:
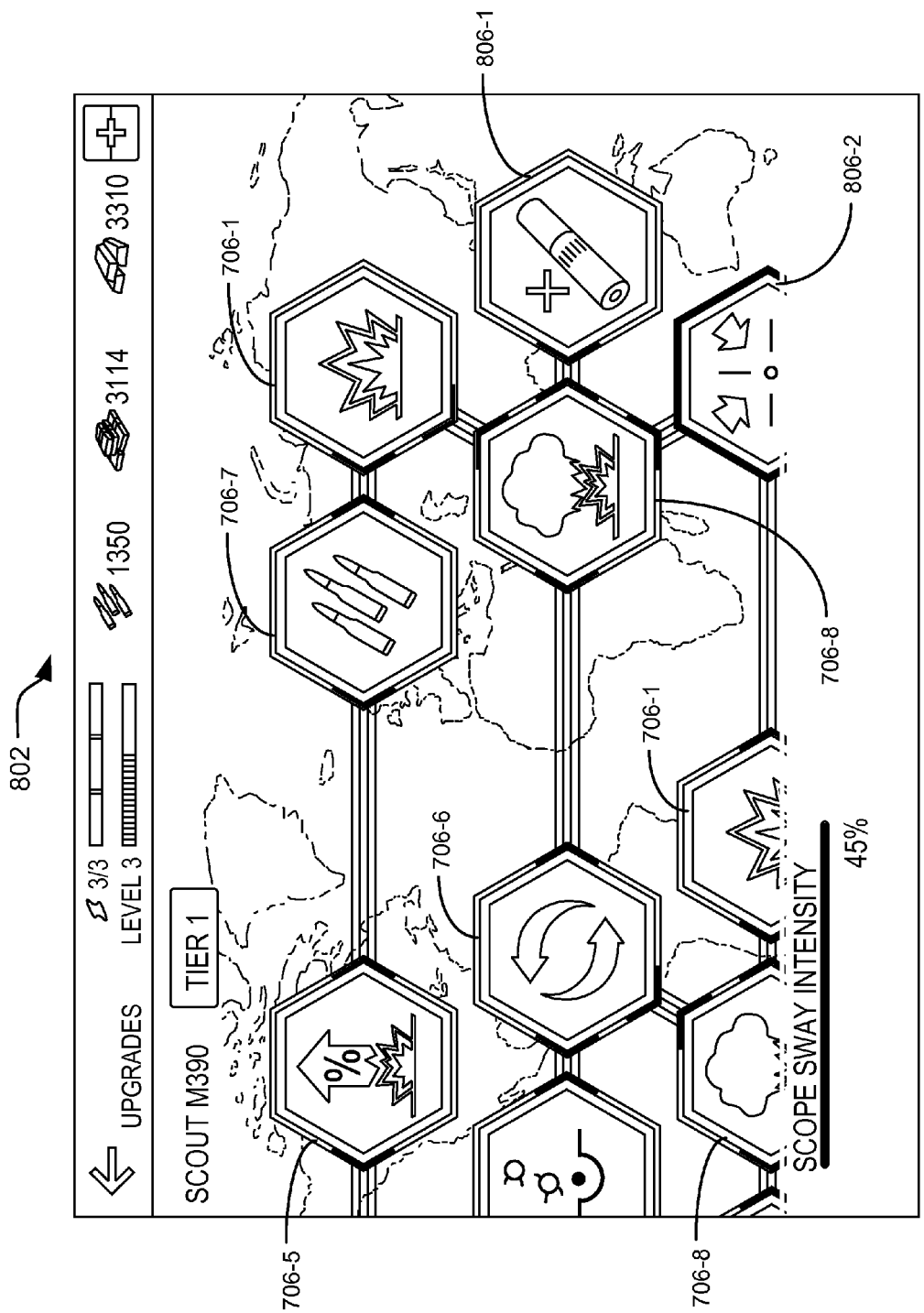

One goal of the game is to accumulate game credit by infiltrating enemy bases in campaigns 348. In a campaign, the user's avatar 602 must infiltrate a base and compromise a base target. In some embodiments the base target is a henchman in a particular room within the base. To compromise the base target the user must get through the base defenses. These base defenses include guards that are adverse to the user and use weapons against the user's avatar when the avatar is discovered by the defendants in the base. To ward off and neutralize these defenses the user selects an item 66, such as a weapon. For instance, referring to FIG. 6, in the initial user interface, the default weapon for the illustrated user is a Commando XM-7. Base infiltration is not an easy task, it requires skill on the part of the user as well as good weapons. Accordingly, the user can upgrade the weapon through toggle 606 of example initial interface 404 in exchange for game credit. When the user selects to upgrade a weapon through toggle 606, a menu such as that illustrated in FIGS. 7 and 8 are illustrated. FIG. 7 illustrates the weapon characteristics upgrades 702 that are possible for one selected weapon, the Defender. FIG. 8 illustrates the weapon characteristics upgrades that are possible for another selected weapon, the Scout M390. In some embodiments, some of the weapon characteristics upgrades (or other forms of item characteristic upgrades) are locked until the user advances to a higher tier. As illustrated in FIG. 7, the user's tier level 704 is presently "tier 1", the lowest, or initial tier. As such, in some embodiments of the present disclosure, some item characteristics upgrades are not available or are locked even though the user may have sufficient game credit. In panel 702, icon 706-1 represents damage—the amount of damage a weapon will inflict when it hits a target. In some embodiments, damage is rated on a numeric scale, such as 1 to 24, with higher numbers representing more significant damage, and the user is able to exchange game credit, illustrated as icons 708-1 and 708-2 of panel 702 of FIG. 7, for a larger number on this scale. Referring to FIG. 2, in some embodiments, the fact that a user possesses an item is stored as element 66 in user profile 48, and the item characteristics, such as the damage number, is stored as an item characteristic 68. Continuing to refer to panel 702 of FIG. 7, other characteristics of an item that are numerically ranked and individually stored as items characteristics 68 in accordance with some embodiments of the present disclosure include recoil power 706-2, range 706-3, accuracy 706-4, critical hit chance 706-5, reload time 706-6, ammunition clip size 706-7, and critical damage multiplier 706-8.

In panel 702 of FIG. 7, there are connections 708 between the icons 706 for various weapon characteristics. In some embodiments, connections 708 highlight the sequential order by which characteristics must be selected in order to acquire a specific weapon characteristic. For instance, in order to select the first instance of characteristic 706-2 or the characteristic 706-4 or the characteristic 706-6, the user must pay for the characteristic 706-1. The same characteristic can be represented multiple times in panel 702. For instance, characteristic 706-2 is listed twice (far left and far right of the screen image). Each instance of characteristic 706-2 in the panel 702 allows the user to upgrade the characteristic to a better numeric level in exchange for game credit. In some embodiments, achieving a better numeric level means increasing the numeric level of the characteristic. In some embodiments, achieving a better numeric level means decreasing the numeric level of the characteristic. In some embodiments, not all upgrades cost the same. Accordingly, in some embodiments item database 328, illustrated in FIG. 3, is used to track items 330 that are available in the game, the cost 332 of each such item, if any, the characteristics 334 of each such item and the numeric scale of each such characteristic, the default characteristic value on the numeric scale of each such characteristic, and the amount of game credit that is required to advance (incrementally improve) each such characteristic by a predetermined amount on their corresponding numeric scale. Moreover, as illustrated in FIG. 8, not all the characteristics available for an item are the same. As illustrated in FIG. 8, the Scout M390 includes many of the same characteristics available for upgrade as the Defender of FIG. 7, such as upgrades 706-1, 706-5, 706-6, 706-7, and 708-8. However, the Scout M390 also includes a silencer weapon upgrade 806-1 and a scope sway intensity upgrade 806-2. While this discussion has used weapons and weapon characteristics to highlight certain concepts, it will be appreciated that the same concepts are applicable to any virtual item of use in a video game such as armor, potions, and the like.

Figure 9:
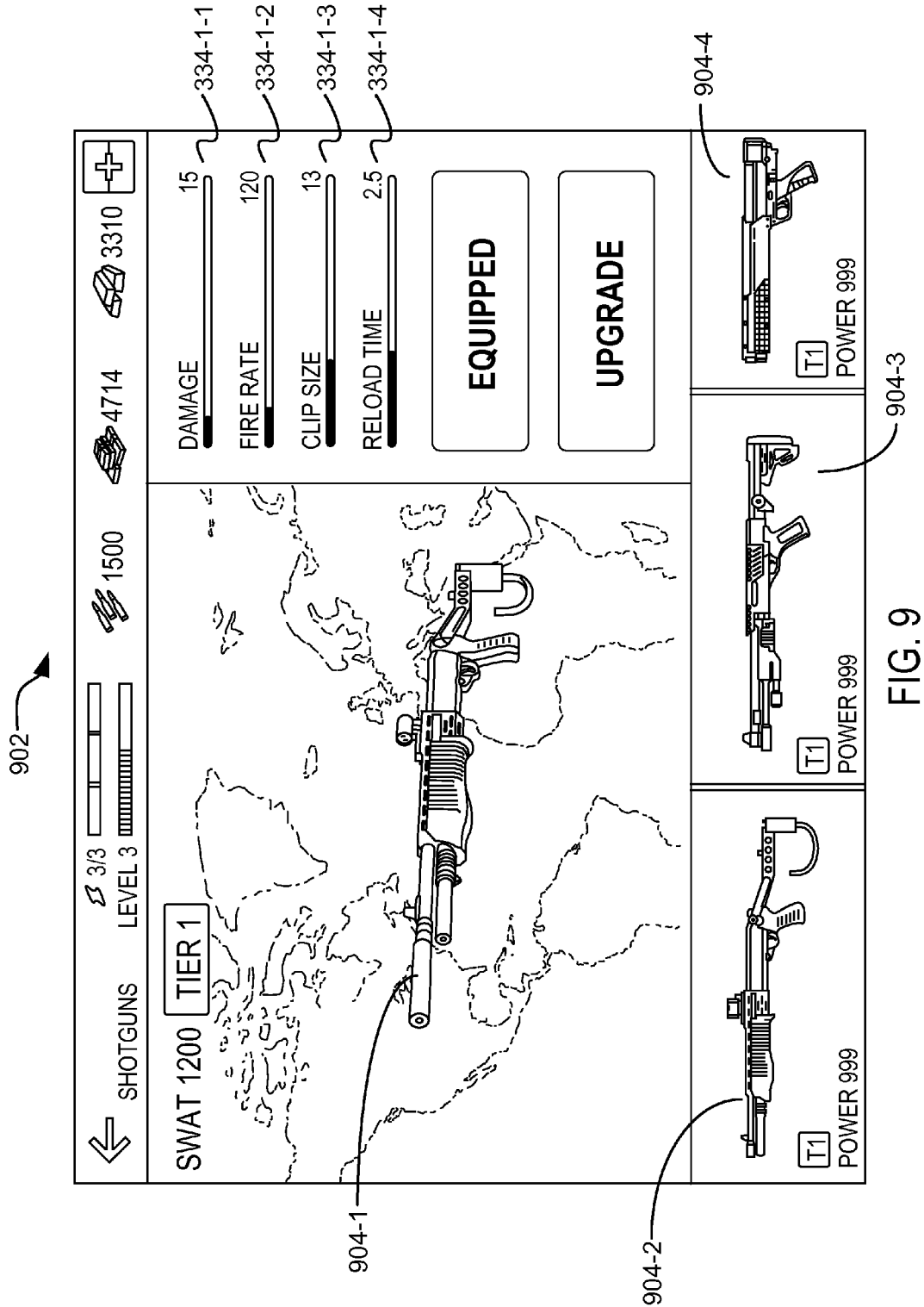
FIG. 9 is a screen image showing the weapons available in a predefined category, as well as the initial characteristics, on a numeric scale, of such weapons, in accordance with an embodiment of the present disclosure.

Referring back to FIG. 4, by selecting store icon 610, the user can select new items 330. In some embodiments, when the user selects the store icon 610, item categories (e.g., assault rifles, sniper rifles, shotguns, tesla rifles, "equipment" such as knives, etc.) are presented to the user for selection. Upon selection of an item category, the user is presented with the items of that category. For example, referring to FIG. 9, when the user selects the shotguns category, panel 902 is displayed, in which the user is presented with various shotguns 904, one of which is featured. The user can toggle which item is featured. As illustrated in FIG. 9, the default characteristics 334, on corresponding numerical scales, of the feature item 904 are displayed so that the user may evaluate whether the item is suitable for contemplated campaigns 348.

Referring back to FIG. 4, item purchased by the user and item upgrades made by the user are stored in the user's profile 422. Further, the user's profile 422 is updated to reflect the usage of game credit for these items and/or item upgrades. In one example, the item is armor, the item characteristic is armor strength on a numerical scale, and the item upgrade is an improvement in the armor strength on the numeric scale. The user selects a campaign in order to acquire game credit 406. In a campaign, an avatar of the user is posed against a plurality of defendants of a base in a three dimensional action format in which the avatar and the plurality of defendants are adverse to each other and uses weapons against each other (e.g., fire weapons at each other).

In some such embodiments, the avatar has an ability to fire a projectile weapon (e.g., fire a gun, light crossbow, sling, heavy crossbow, shortbow, composite shortbow, longbow, composite longbow, hand crossbow, repeating crossbow, etc.) in three dimensions during a campaign.

In some such embodiments, the avatar has an ability to swing a weapon (e.g., glaive, guisarme, lance, longspear, ranseur, spiked chain, whip, shuriken, gauntlet, dagger, shortspear, falchion, longsword, bastard sword, greataxe, greatsword, dire flail, dwarven urgrosh, gnome hooked hammer, orc double axe, quarterstaff, two-bladed sword, etc.) in three dimensions during a campaign.

In some such embodiments, the avatar has an ability to throw a weapon (e.g., daggers, clubs, shortspears, spears, darts, javelins, throwing axes, light hammers, tridents, shuriken, net, e.g.) in three dimensions during a campaign.

Figure 10:
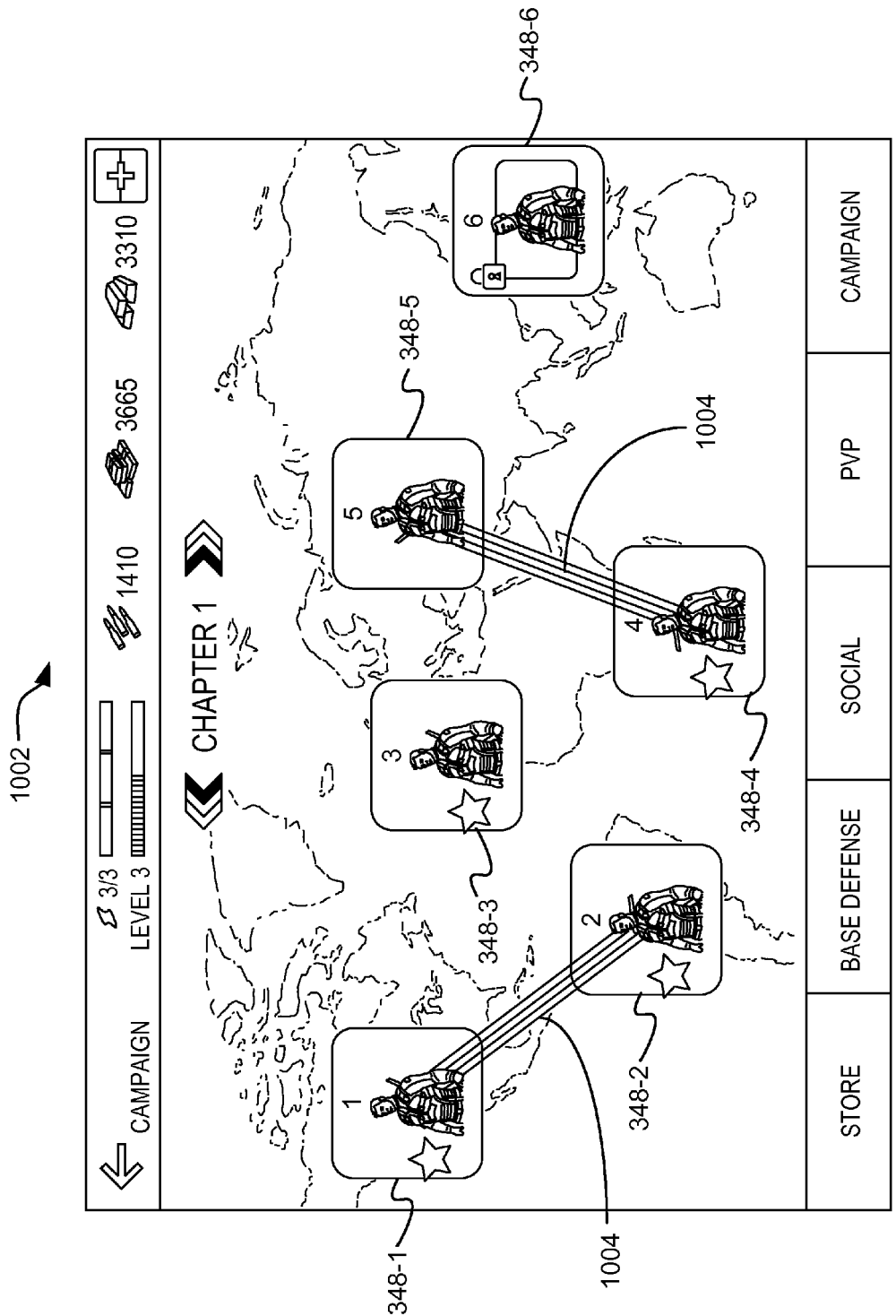
FIG. 10 is a screen image showing the campaigns that are available for a user, and the order by which such campaigns are to be completed, in accordance with an embodiment of the present disclosure.

Referring to FIG. 6, in response to selection of the campaign button 608, a description of available campaigns 348 is provided. In some embodiments, the available campaigns 348 are stored in campaign database 346 on gaming server 106. FIG. 10 provides an example, in accordance with some embodiments of the present disclosure, of campaigns 348 that are available to a user. As was the case with item upgrades, in some embodiments of the present disclosure, in some embodiments there is a sequential order imposed on the campaigns. That is, certain campaigns 348 must be successfully completed by the video game user before other campaigns can be attempted. In panel 1002 of FIG. 10, the sequential order of the campaigns is illustrated by lines 1004. For instance, they show that campaigns 348-1 or 348-4 must be attempted first, after which point campaigns 348-2 and 348-5 can be attempted. Once campaign 348-2 is successfully completed a line (not shown) is drawn to campaign 384-3 on panel 1002 indicating that it now may be attempted by the video game user.

Figure 11:
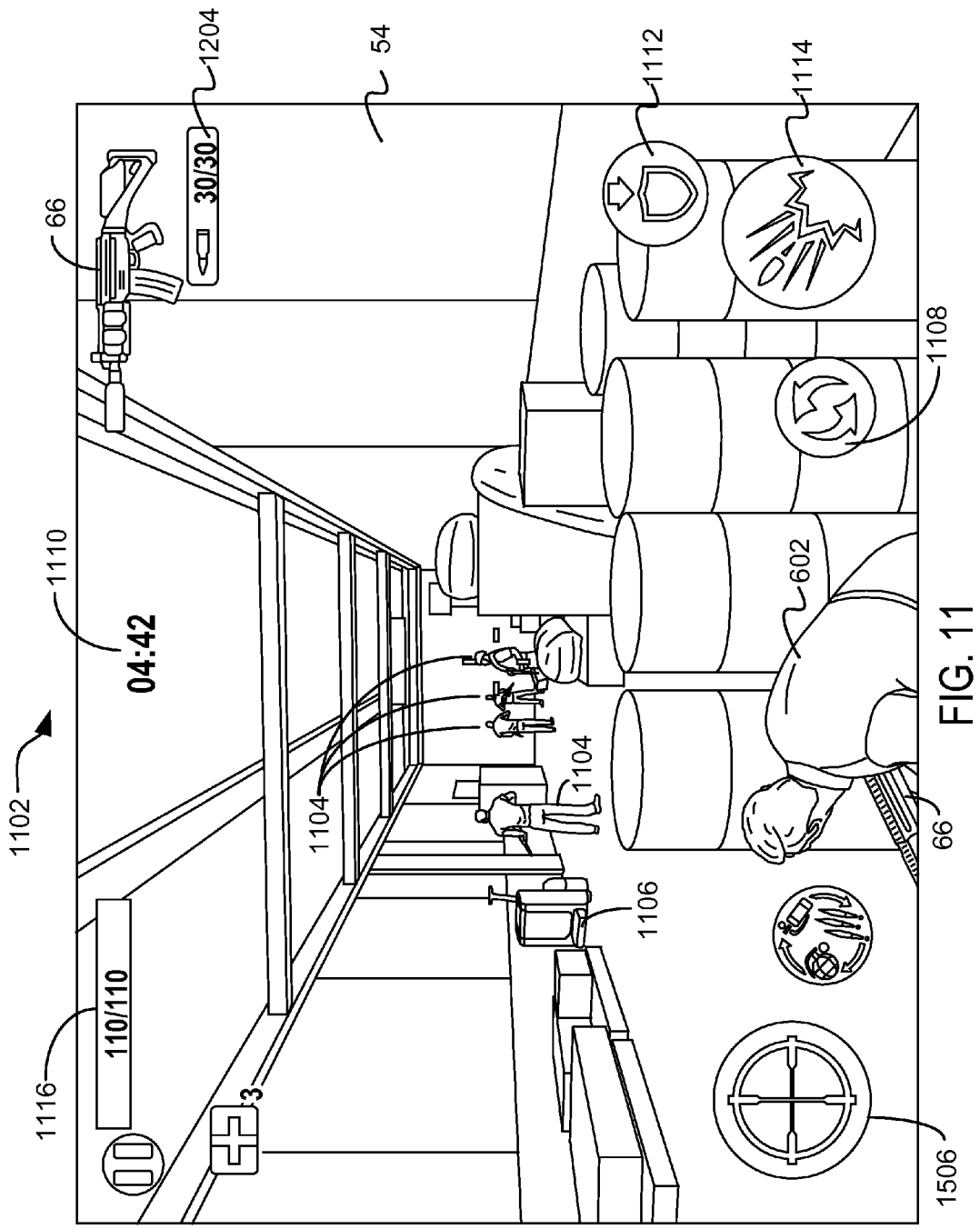
FIGS. 11 through 14 are successive screen images of a first campaign that is successfully completed, in accordance with an embodiment of the present disclosure.

As an example, selection of campaign 348-1 on panel 1002 leads directly to the starting point 1102 of the corresponding campaign 348 illustrated in FIG. 11. Here, the avatar 602 of the user is posed against a plurality of defendants 1104 of a base 340 associated with the selected campaign 348 in a three dimensional action shooting format in which the avatar 602 and a plurality of defendants 1104 are adverse to each other and use weapons against each other. Specifically, the avatar 602 has been placed in a first three-dimensional pre-fabricated section 54 of the base 340, in this example a warehouse that includes various barrels, boxes, crates and a forklift 1106. Advantageously, the avatar 602 has an ability to fire a weapon (one form of item 66) in three dimensions during the campaign 348. The user controls the view of the three-dimensional section 54 by, for example, touching the screen 26 of the user device 102 of FIG. 2, making up, down, left, or right sweep motions, or combinations thereof to view the room from any angle from the current vantage point of the avatar 602. In other embodiments, the user controls the view of the three-dimensional section 54 by, for example, entering select keyboard commands using the optional keyboard 28 of the user device 102 of FIG. 2, thereby making up, down, left, or right motions, or combinations thereof to view the three-dimensional section 54 from any angle from the current vantage point of the avatar 602. In still other embodiments, the user controls the view of the three-dimensional section 54 by, for example, using an optional mouse of the user device 102 of FIG. 2, thereby making up, down, left, or right motions, or combinations thereof to view the three-dimensional section 54 from any angle from the current vantage point of the avatar 602. In some embodiments, the user can switch items being used sdynamically during a campaign by selecting option 1108, which stops the campaign clock 1110, and allows the user to select from among the items 66 in the user's profile 48 for usage in the campaign. In some embodiments, a clock 1110 reports the amount of time left in the campaign. In some embodiments this represents a deadline before which the avatar 602 must neutralize the base target. If the avatar 602 neutralizes the base target before the clock 1110 counts down to zero (or counts up to some predetermined time), then the campaign is deemed successful (408). If the avatar 602 does not neutralize the base target before the clock 1110 counts down to zero (or counts up to some predetermined time) or is killed by defenders 1104, the campaign is deemed unsuccessful (410). Referring to FIG. 11, in some embodiments, the avatar 602 can toggle between a safety position behind an obstacle, such as the barrels of FIG. 11, and a firing position by pressing the safety toggle 1112.

Figure 21:
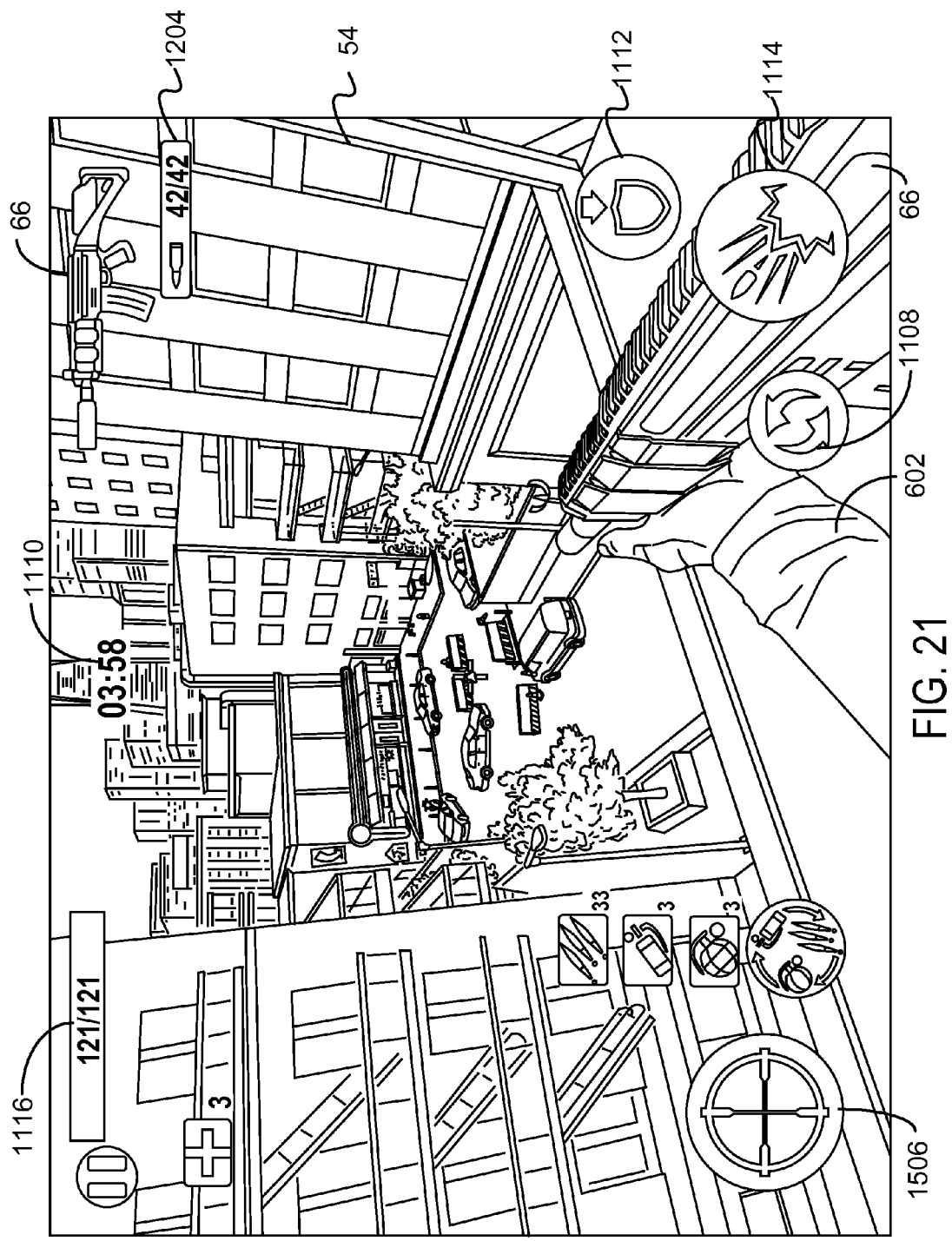
Figure 22:
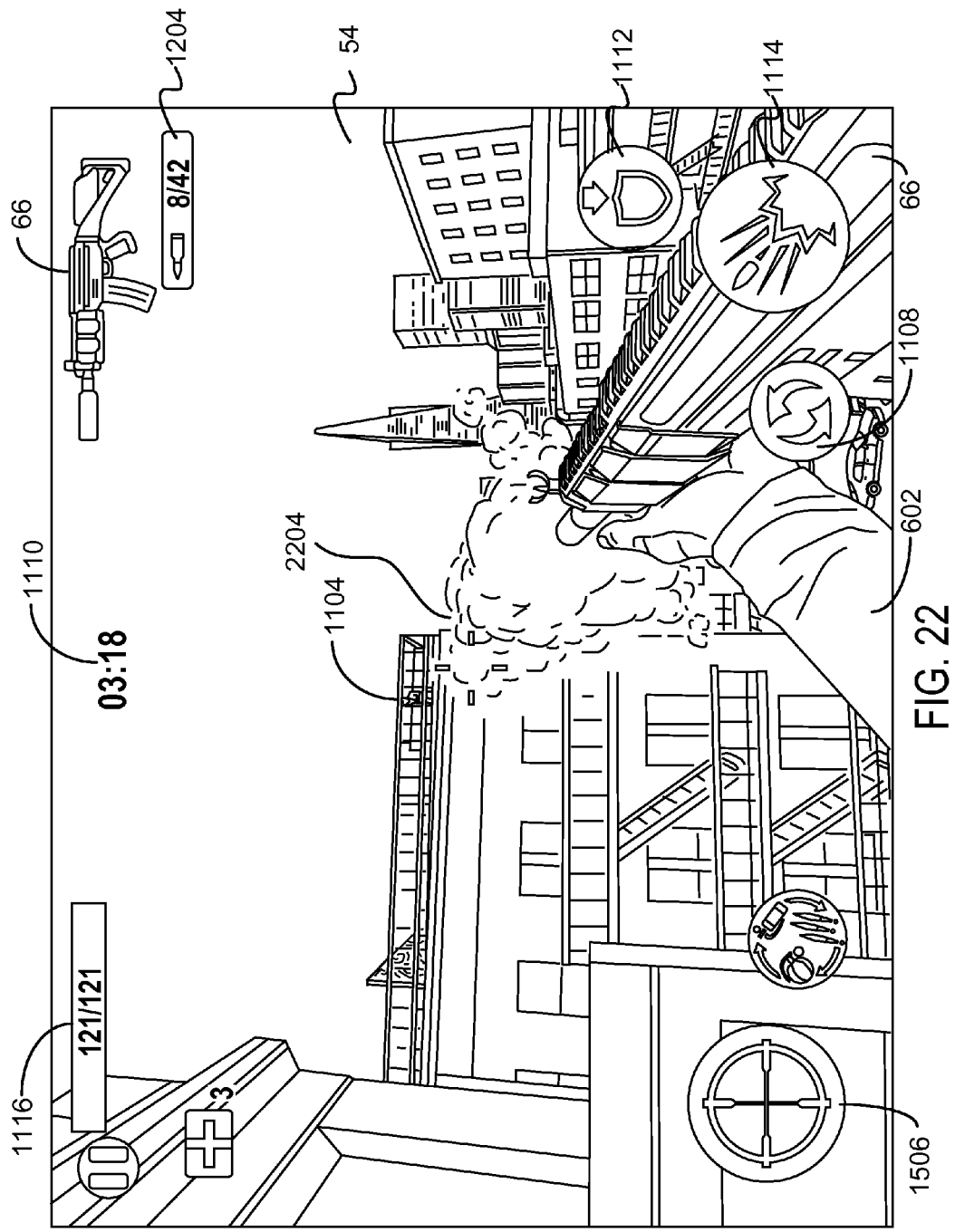

FIG. 21 illustrates the avatar 602 in a firing position in another campaign 348. FIG. 22 illustrates the avatar 602 actually firing a weapon. In particular, FIG. 22 illustrates how the avatar 602 is able to fire a weapon (one example of an item 66) in three dimensions during a campaign 348. When the user toggles into firing position, either by selecting the safety button 1112 or the firing button 1114, cross-hairs 2204 are presented. The user can aim the weapon by moving the cross-hairs 2204 in up, down, right or left directions, or any combination of two orthogonal directions (e.g., up and right), thus achieving complete two-dimensional control over the aim. The third dimension is governed by the spacing between the avatar 602 and the target. In FIG. 22, the avatar is firing into the third dimension at a defendant 1104 on a rooftop. Advantageously, the user can drag the aim 2204 in up, down, right or left directions, or any combination of two orthogonal directions (e.g., up and right) while at the same time firing using button 1114. In some embodiments, one or more attributes of the aim 2204 changes (e.g., turns red, becomes larger, blinks, etc.) when the aim has locked onto the coordinates of a defendant 1104.

Returning to FIG. 11, a health indicator 1116 indicates the overall health of the avatar 602 in the game. In the campaign 348 illustrated in FIGS. 11 through 14, as the user progresses through the game and is hit by defendant 1104 weapon fire, the health decreases. In some embodiments, when the user neutralizes the base 344 target before the health indicator 1116 indicates that the overall health of the avatar 602 is zero and before the time 1110 has expired, the user is deemed to have successfully completed the game and is awarded game credit (408). Otherwise, the user is deemed to not have successfully completed the campaign (410).

Figure 12:
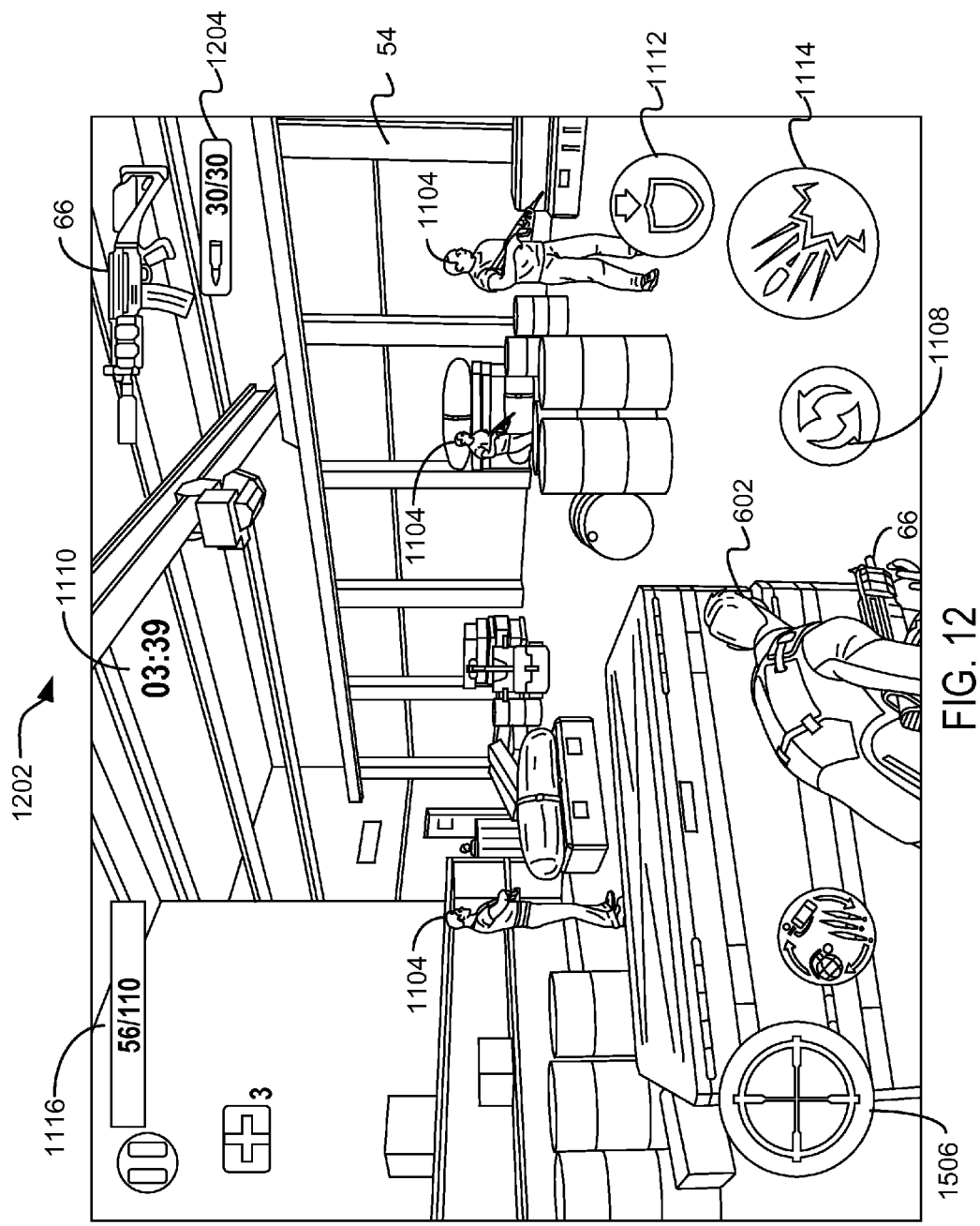
Figure 31:
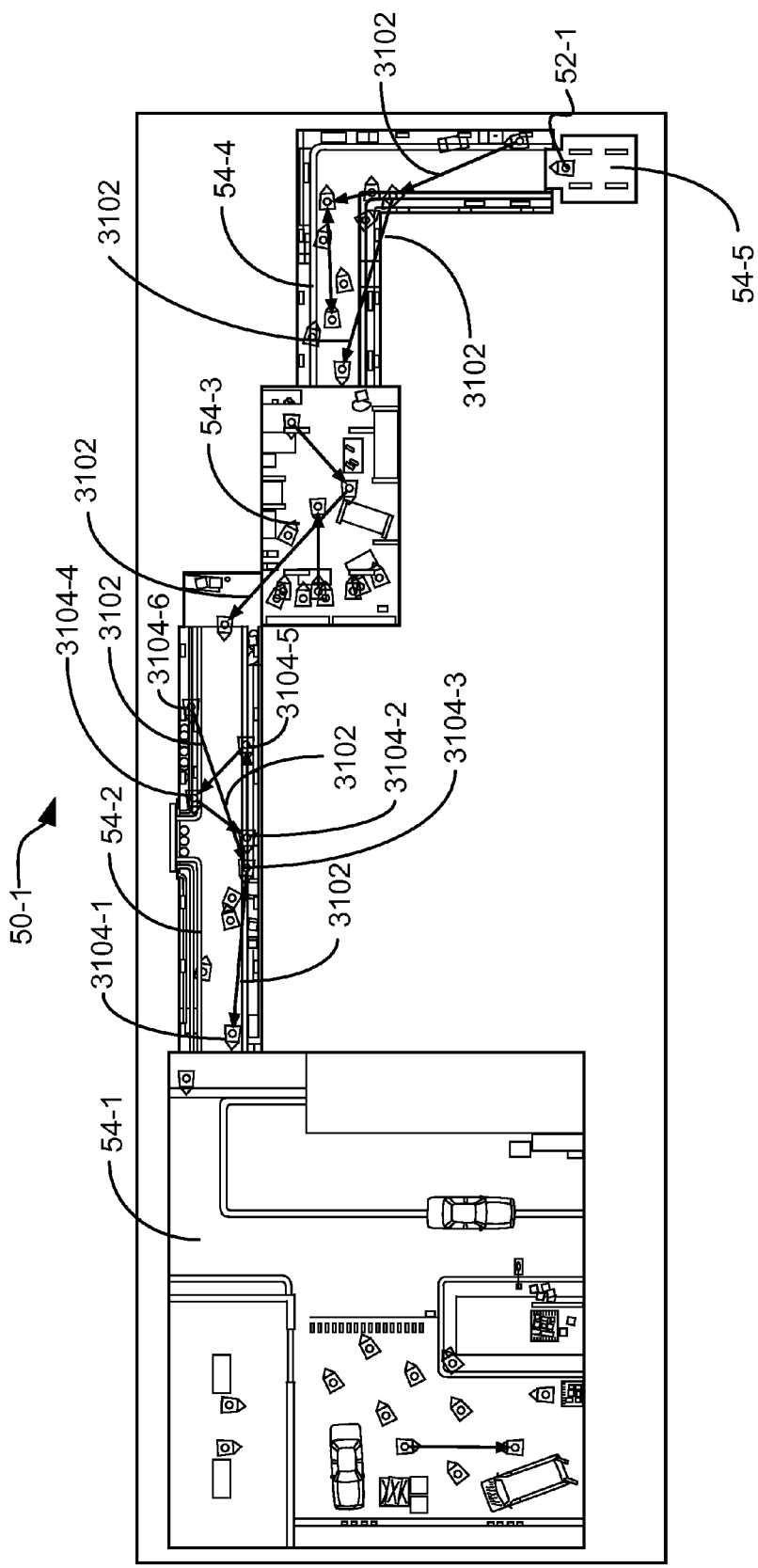
FIG. 31 illustrates the blueprint of a user base in accordance with an embodiment of the present disclosure.

In FIG. 11, once the avatar 602 of the user has neutralized all the defendants in the depicted three-dimensional section 54 of the base 342, the avatar 602 is able to traverse through the section 54 to the next three-dimensional section 54 of the base 342 through a doorway, window, or other form of passageway that connects the two sections 54. This leads the avatar 602 to another section 54 of the base 54, which is illustrated in panel 1202 of FIG. 12. In typical embodiments, the path the user takes is predetermined and is part of the base 50 plans. For example, FIG. 31 illustrates the blueprint of a base with a predetermined path 3102 that the user must take to get to the base target 52. The user is able to stop as specific points (e.g., points 3104) along the path. Returning to FIG. 12, once again, the avatar uses one or more items 66 (e.g., weapons) to neutralize several armed defendants 1104 that, once alerted to the avatar's presence 602, shoot at the avatar 602, thereby putting the health score 1116 of the avatar at risk. As illustrated in FIG. 12, as the user fires his weapon 12, an indicator 1204 of the amount of bullets remaining in the clip is decremented. When the user runs out of bullets the user must reload. Reloading is disadvantageous because the defendants 1104 can shoot at the avatar 602 and adversely affect the health score 1116 of the avatar 602 during the reload. It is for this reason that a typical characteristic 68 of an item 66 such as a weapon is "reload time", or the amount of time it takes to reload a weapon, and the user can use game credit to make the reload time faster. In cases where the weapon uses some other form of projectile, such as arrows (for bows), bolts (for crossbow), sling bullets (for slings), typical characteristics of such items would include how frequently such a weapons could launch projectiles, how far the projectiles would travel, the accuracy of such weapons, and the amount of damage their projectiles cause.

In cases where the weapon is a reach weapon (e.g., glaive, guisarme, lance, longspear, ranseur, spiked chain, whip, etc.), typical characteristics of such items would include how frequently such a weapons could be swung, the accuracy of such weapons, and the amount of damage such weapons cause when they strike an adversary.

Figure 13:
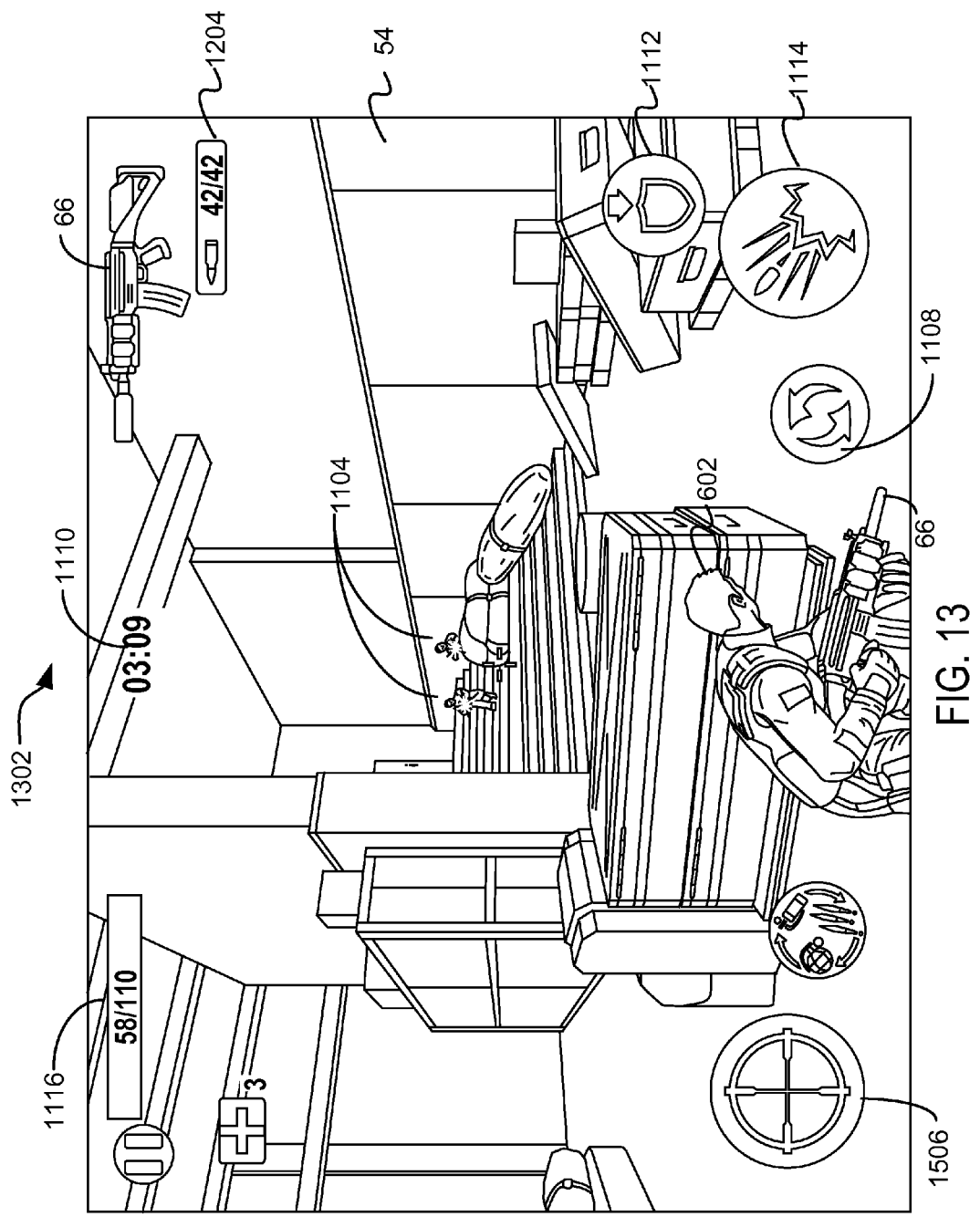
Figure 14:
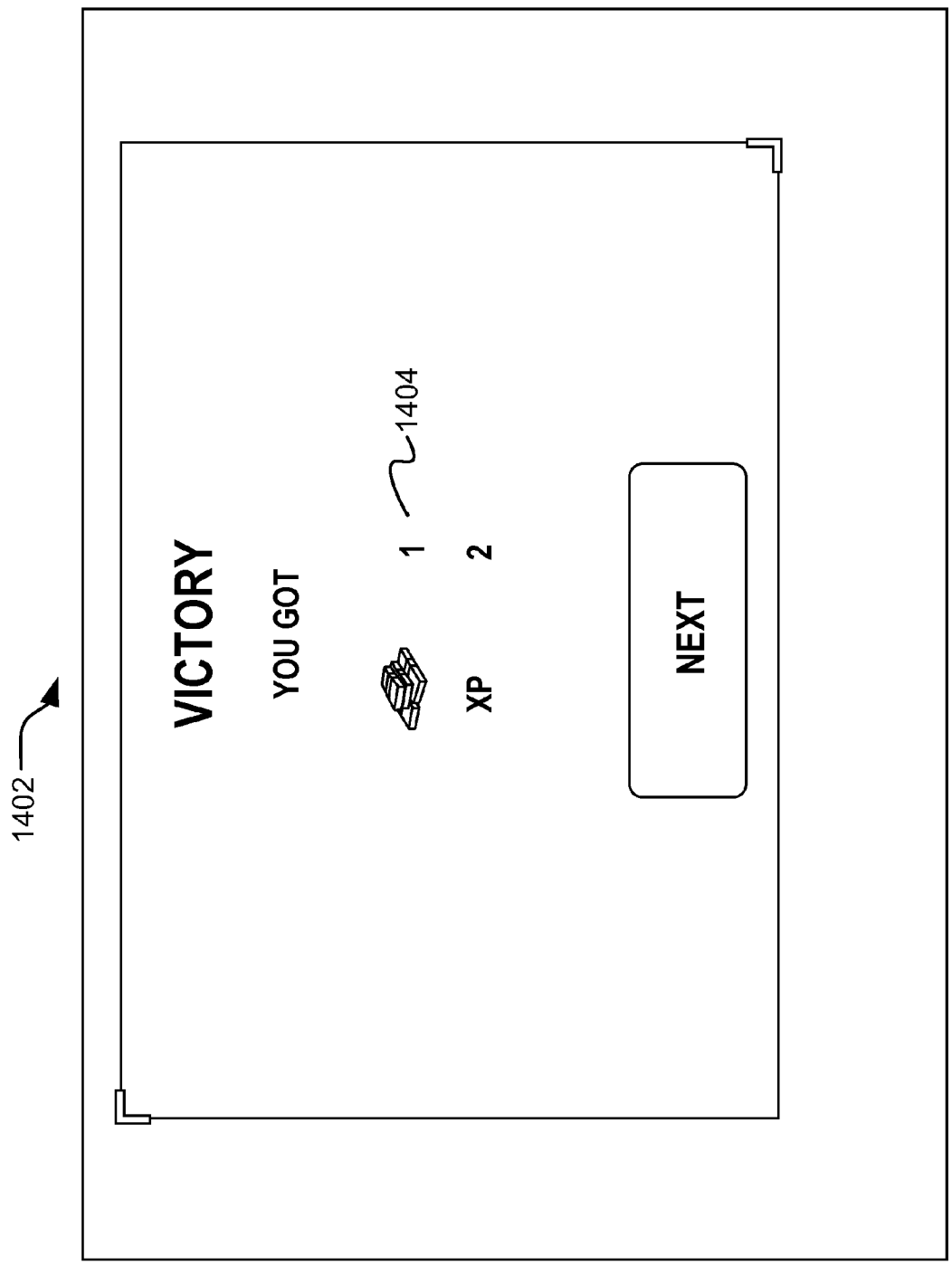

When the user neutralizes the defendants in the second base section 54, the user progresses through a doorway, window, or other form of passageway that connects the two sections 54, for instance to the section 54 illustrated in panel 1302 of FIG. 13. Eventually, the avatar 602 reaches the section 54 that includes a base target. In typical embodiments, the base target is a henchman. If the avatar 602 is able to neutralize the henchman the user is deemed to have successfully completed the campaign (408). In some embodiments, the user is notified of successful completion of the campaign with an award of game credit as illustrated in panel 1402 of FIG. 14. Here, the user receives game credit 1404 for successful completion of the campaign and the user profile is updated with the outcome of the most recent campaign (428).

Figure 15:
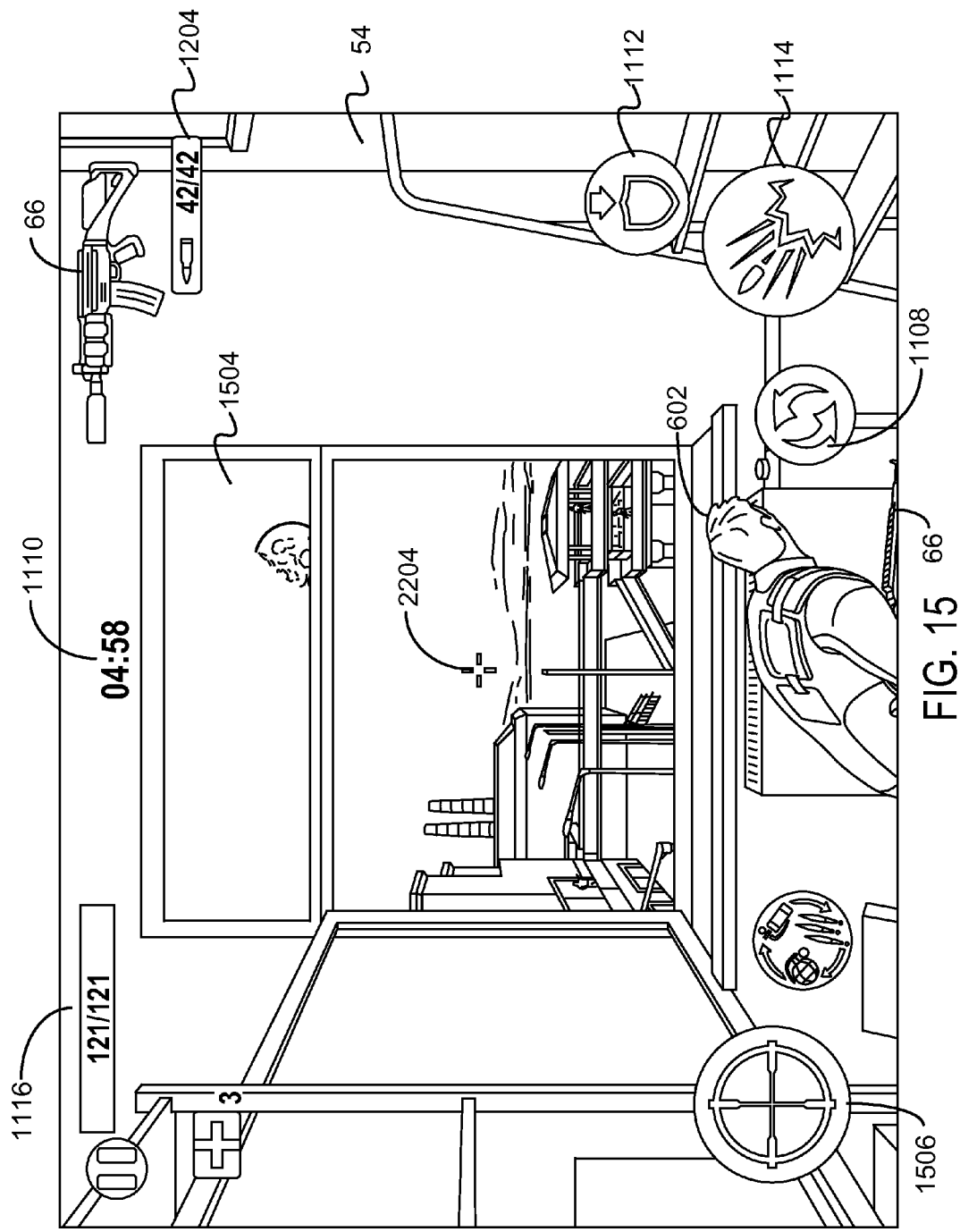
FIGS. 15 through 18 are successive screen images of a second campaign that is not successfully completed, in accordance with an embodiment of the present disclosure.
Figure 16:
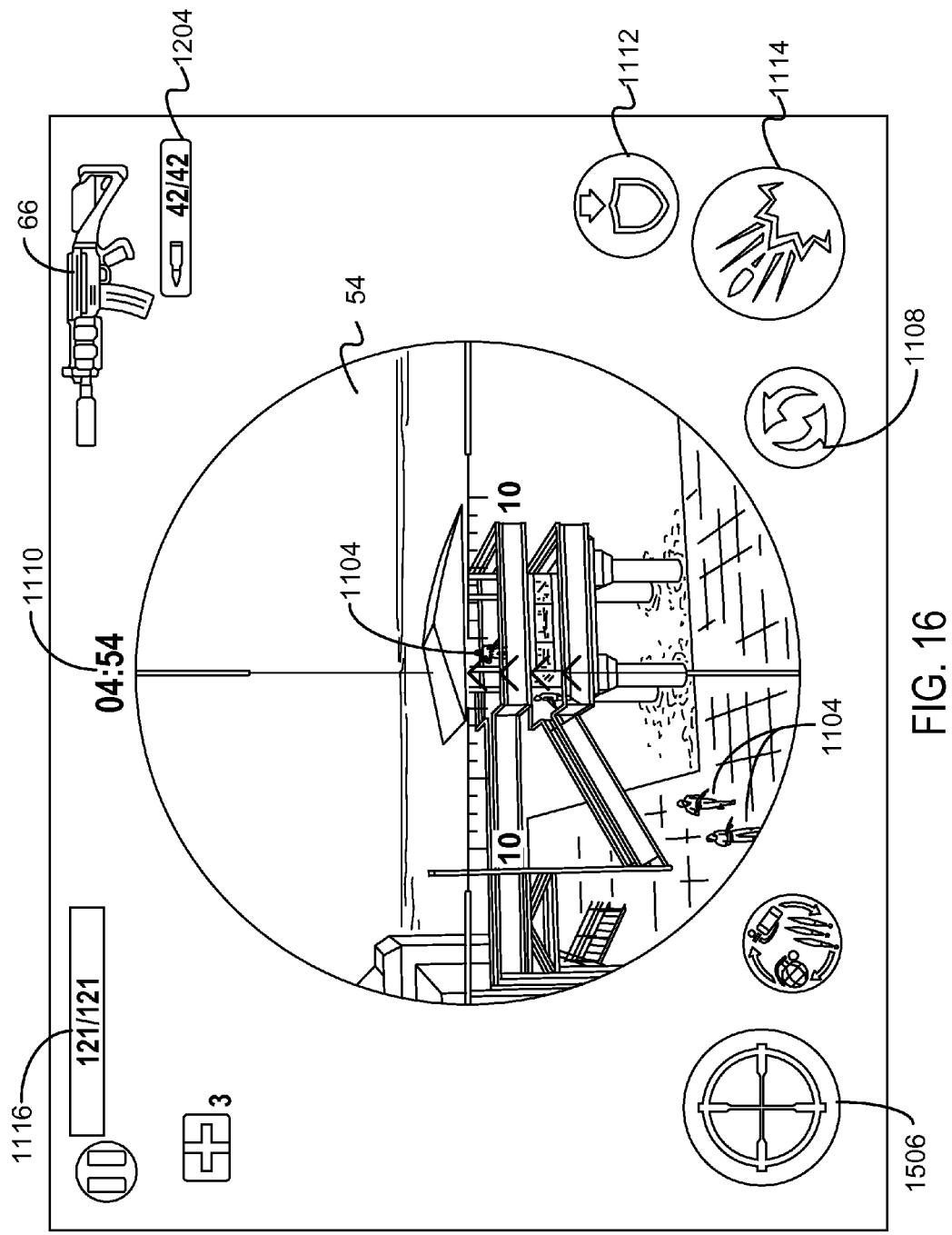
Figure 17:
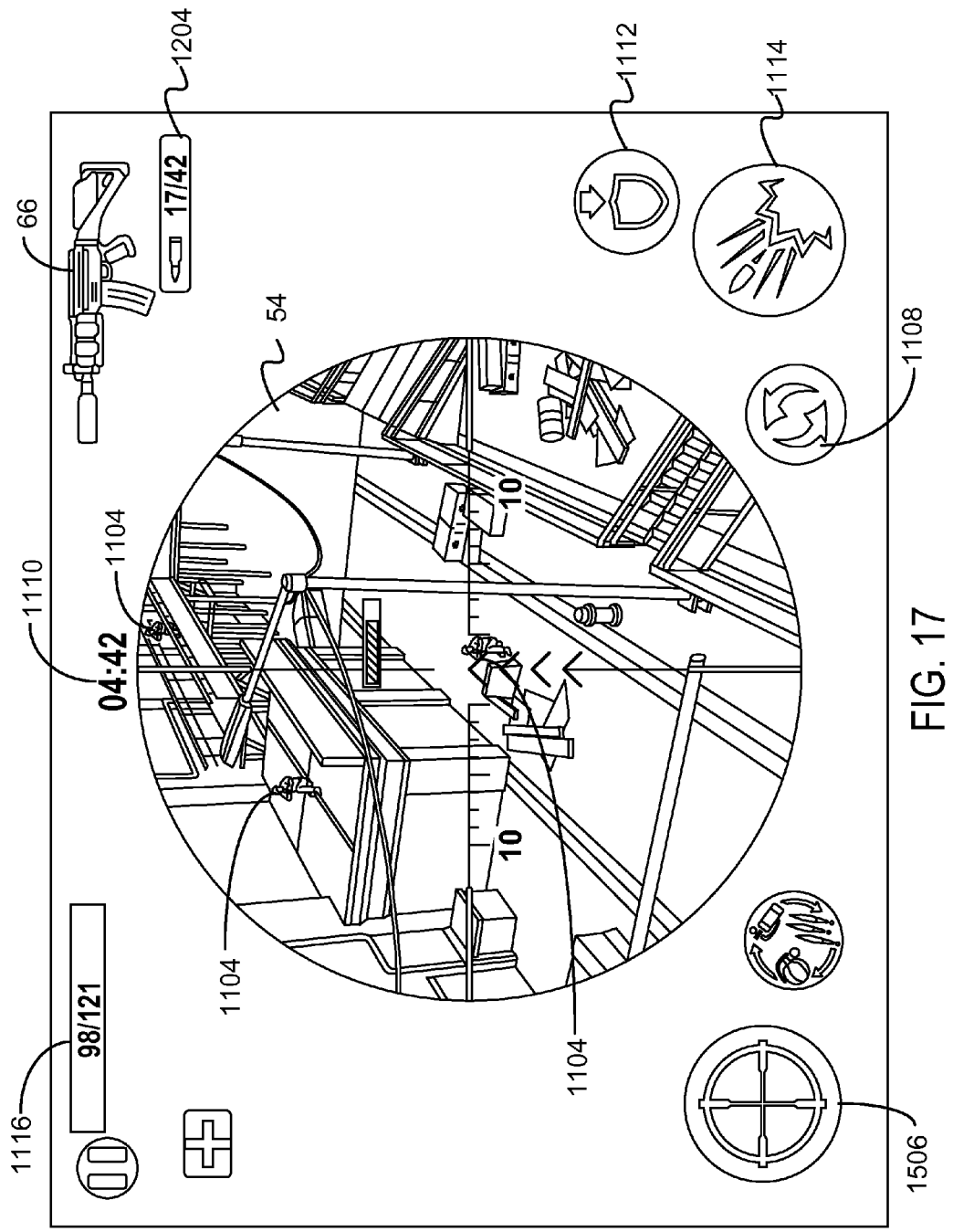
Figure 18:
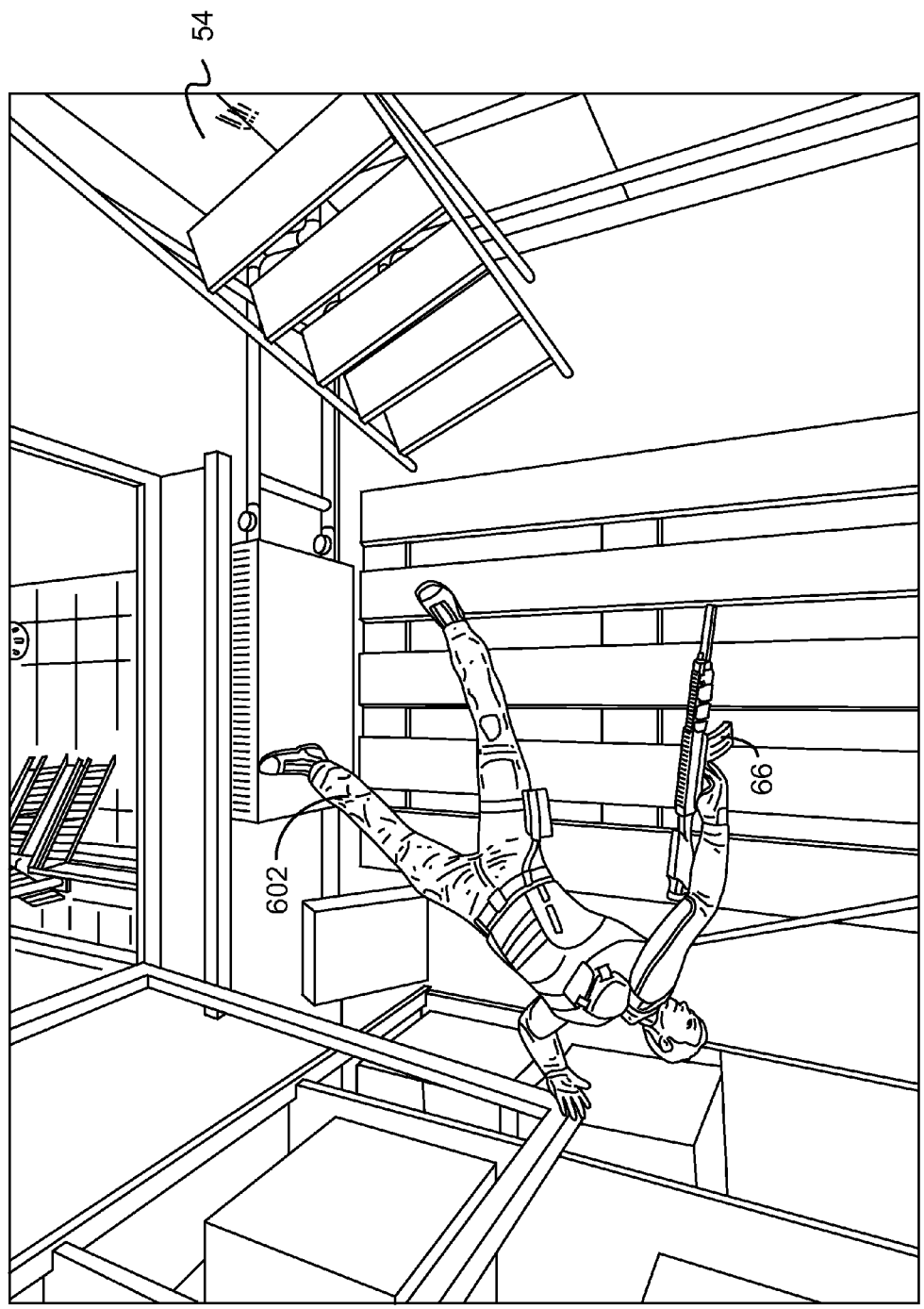
Figure 19:
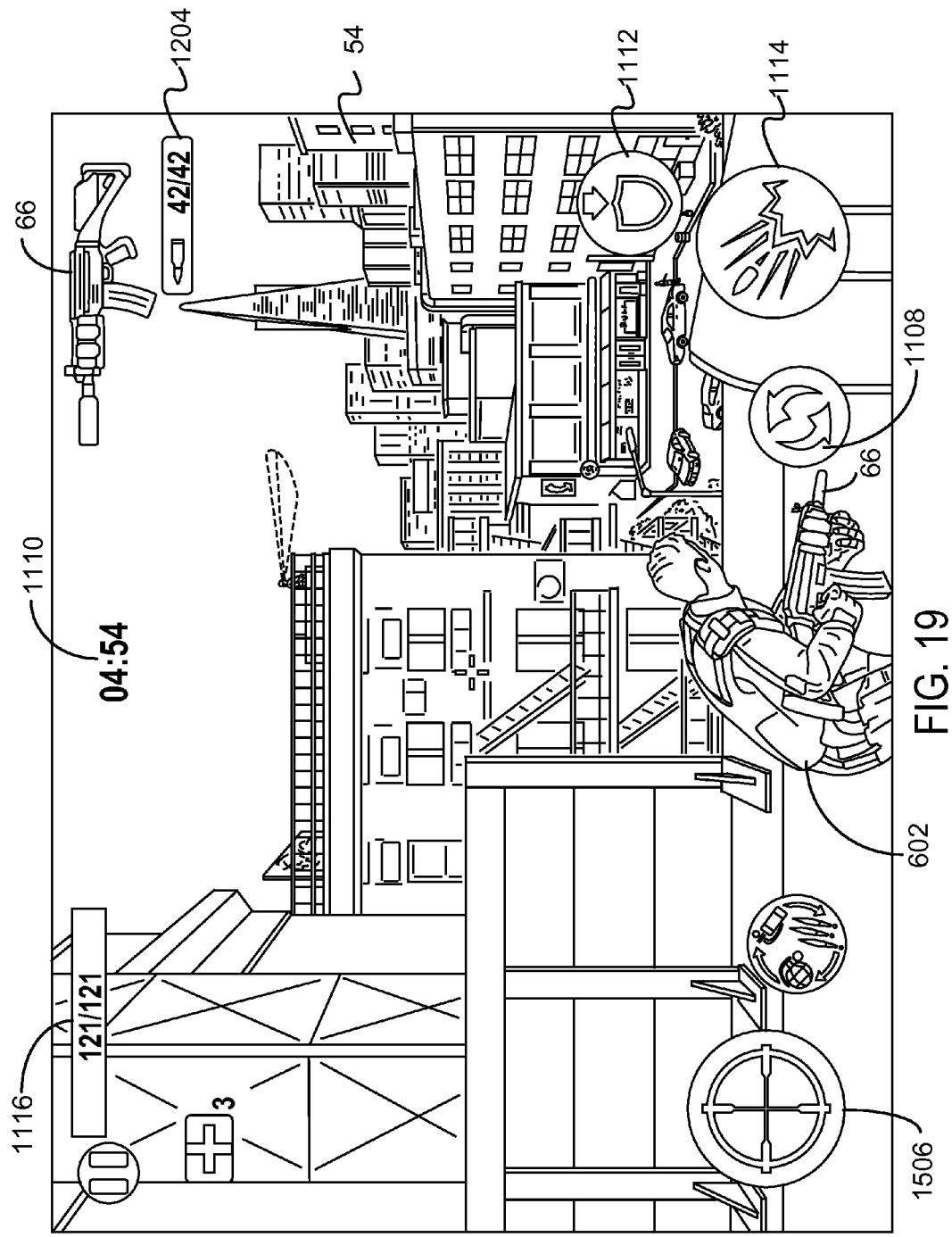
FIGS. 19 through 22 are successive screen images of a third campaign that illustrates how a player is posed as an avatar against a plurality of defendants of a base in a three dimensional action shooting format in which the avatar and the plurality of defendants are adverse to each other and fire weapons at each other and where the avatar has an ability to fire a weapon in three dimensions during the campaign, in accordance with an embodiment of the present disclosure.
Figure 20:
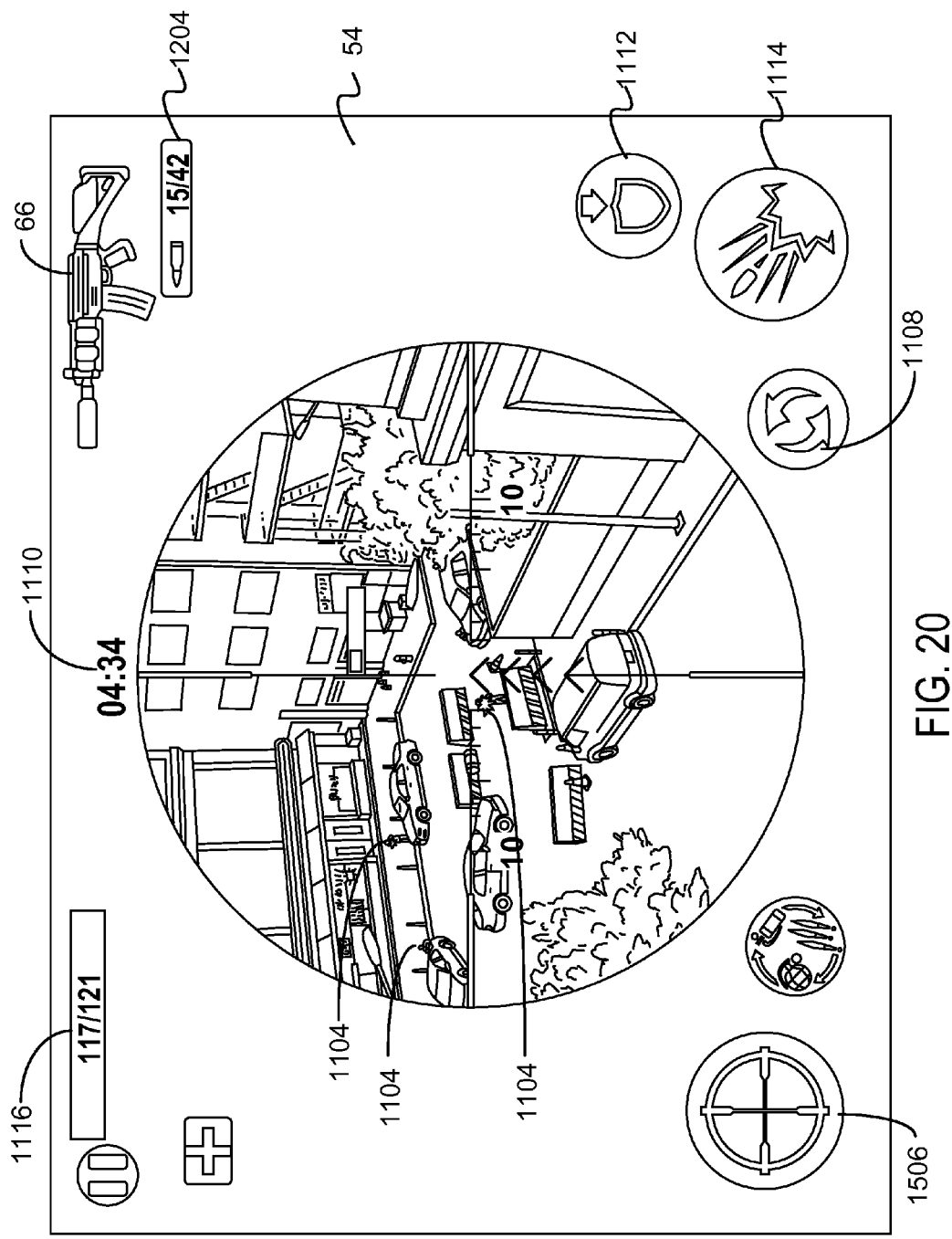

FIGS. 15 through 18 are successive screen images of a second campaign that is not successfully completed, in accordance with an embodiment of the present disclosure. As illustrated in FIG. 15, an avatar of the game player 602 is once again placed in a three-dimensional section 54 of another base 56. In FIG. 15, the avatar 602 must shoot at defendants 1104 through a window 1504. To facilitate aim, in some embodiments a scope 1506 (which is an example of an item 66) is provided. When the user toggles on the scope 1506 a close up view of the defendants through the window 1504 of FIG. 15, as illustrated in FIG. 16, is provided. This improves the user's ability to aim the weapon. Advantageously, the user can fire the weapon while using this telescopic view and can control the up, down, right or left directions, or any combination of two orthogonal directions (e.g., up and right) of the aim, thus achieving complete two-dimensional control over the aim, while the weapon is fired in the third dimension, into the three-dimensional section 54. FIG. 17 illustrates the point. Here the user has panned the scope to another section of the three-dimensional section 54 in order to fire upon additional defendants 1104. However, as illustrated in FIG. 18, this campaign ends unsuccessfully (410) with the avatar 602 terminated by defendant 1104 gunfire.

Figure 23:
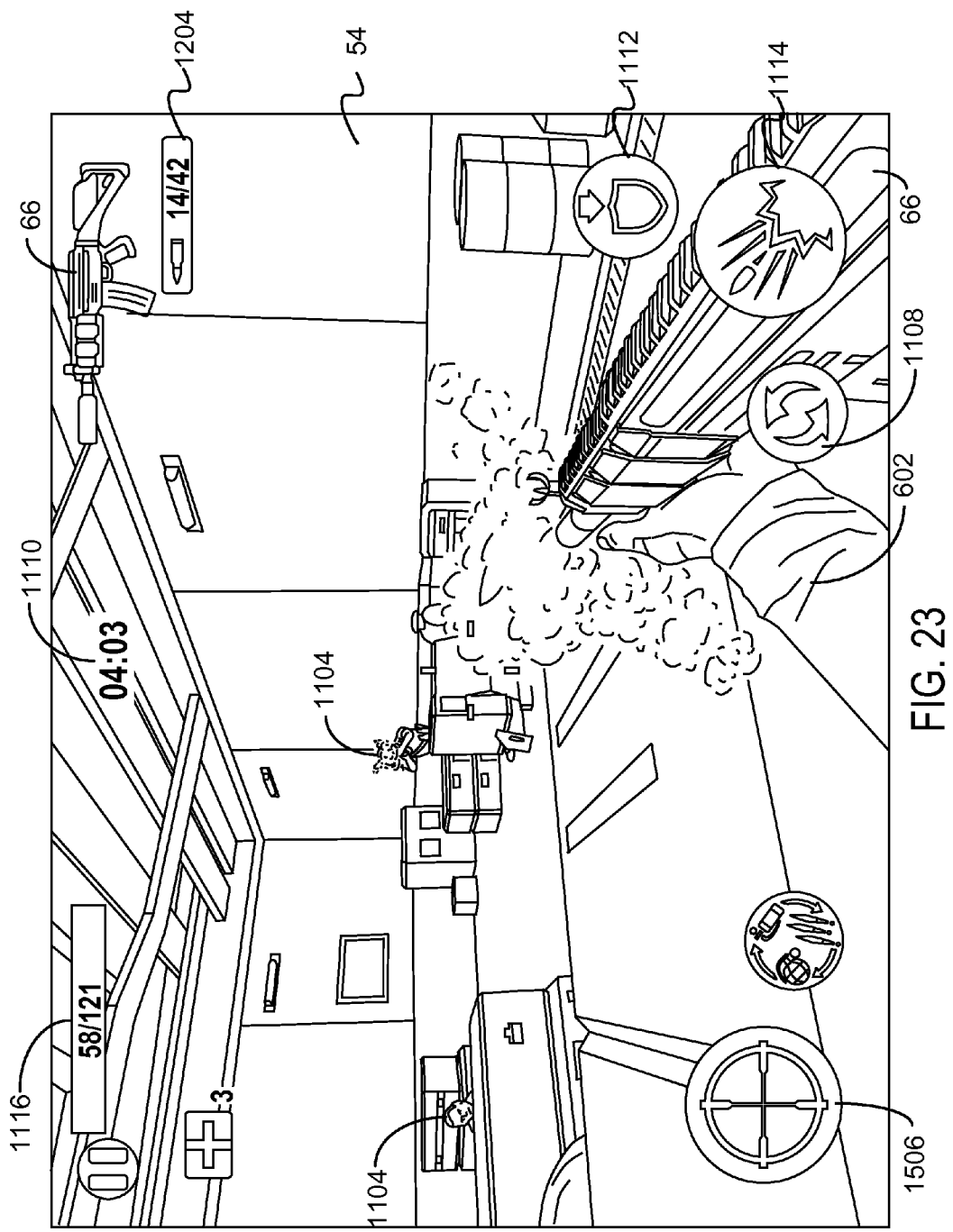
FIGS. 23 through 25 are successive screen images of a fourth campaign that illustrates how a player is posed as an avatar against a plurality of defendants of a base in a three dimensional action shooting format in which the avatar and the plurality of defendants are adverse to each other and fire weapons at each other and where the avatar has an ability to fire a weapon in three dimensions during the campaign, in accordance with an embodiment of the present disclosure.
Figure 24:
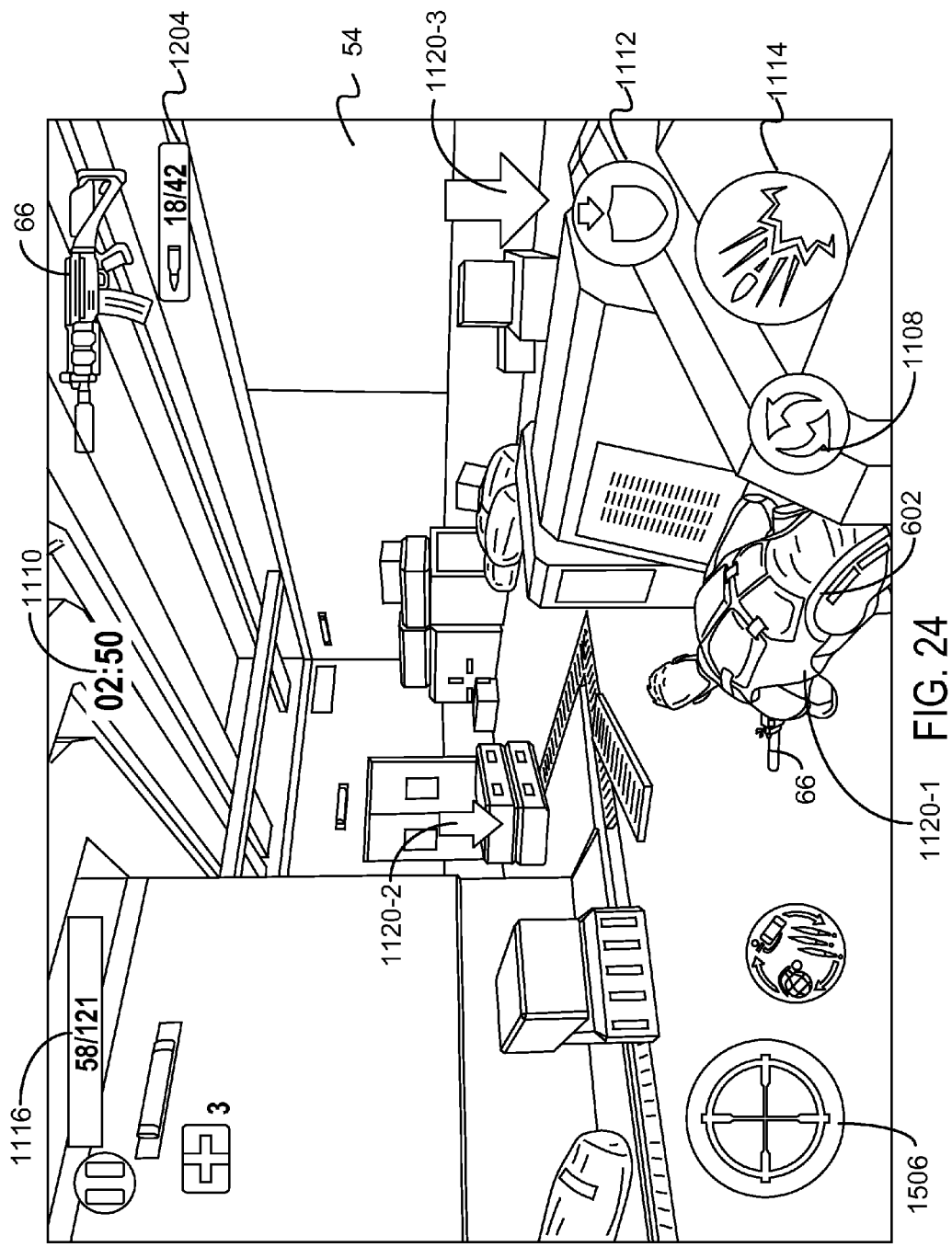
Figure 25:
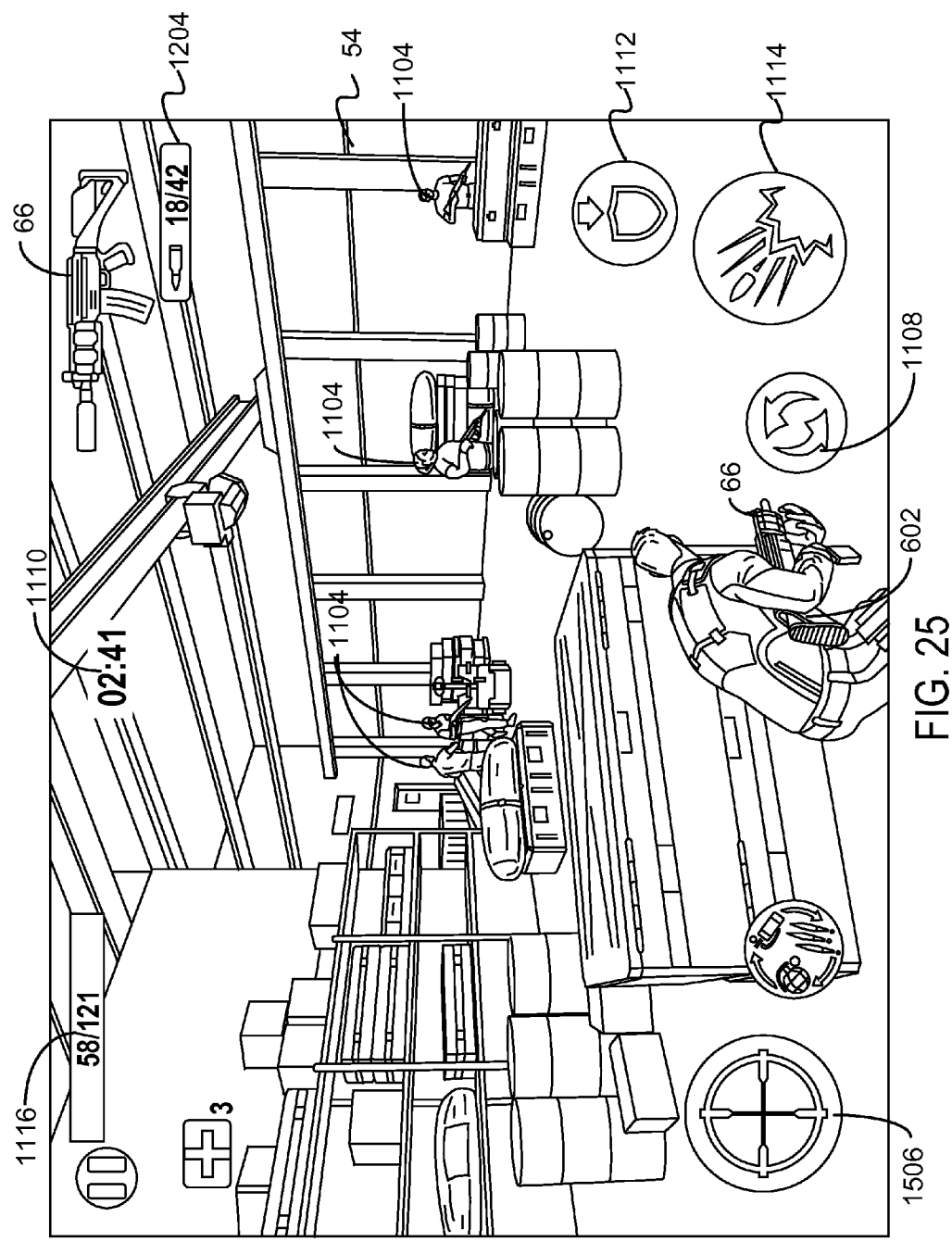
Figure 26:
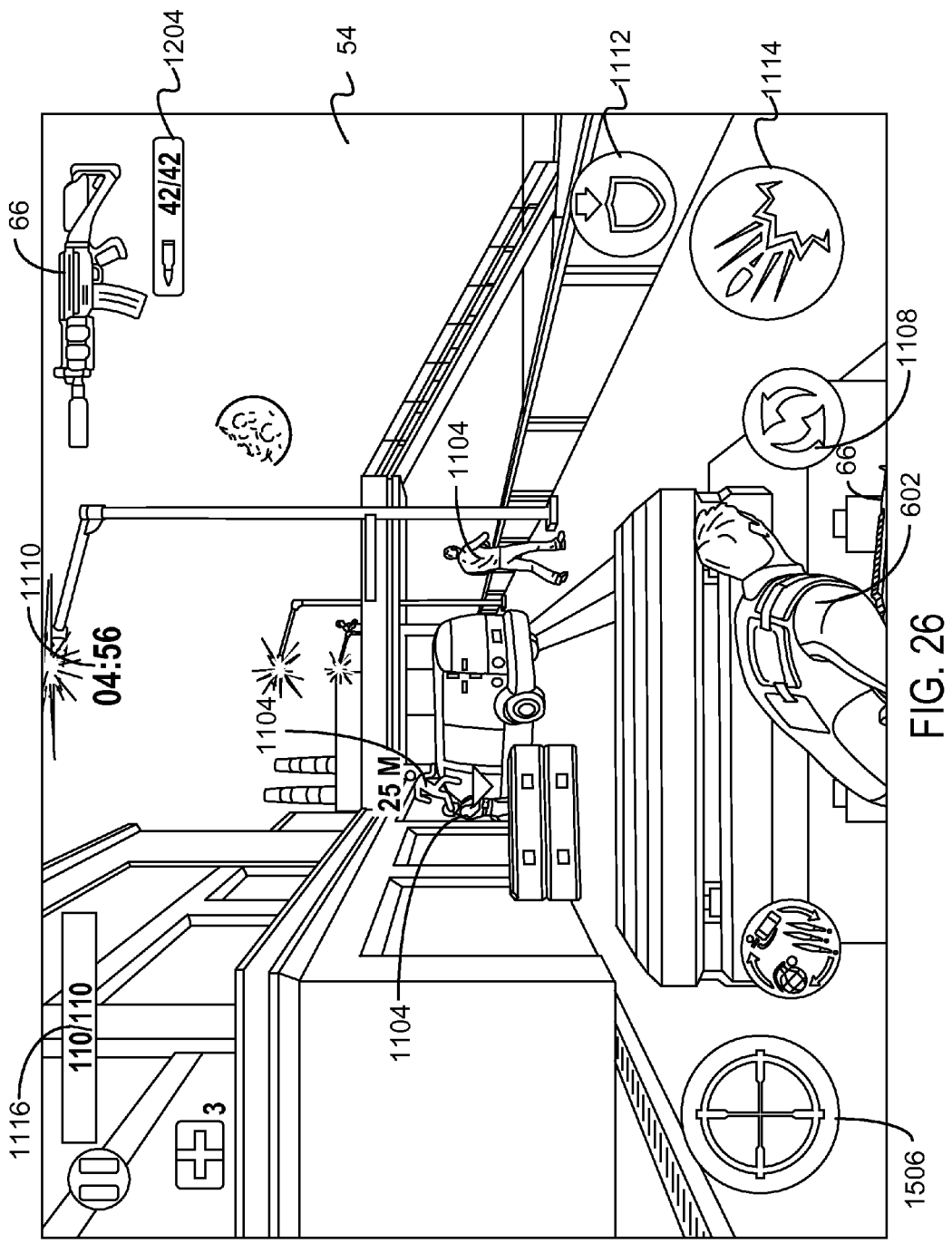
FIGS. 26 through 30 are successive screen images of a fifth campaign that illustrates how a player is posed as an avatar against a plurality of defendants of a base in a three dimensional action shooting format in which the avatar and the plurality of defendants are adverse to each other and fire weapons at each other and where the avatar has an ability to fire a weapon in three dimensions during the campaign, in accordance with an embodiment of the present disclosure.
Figure 27:
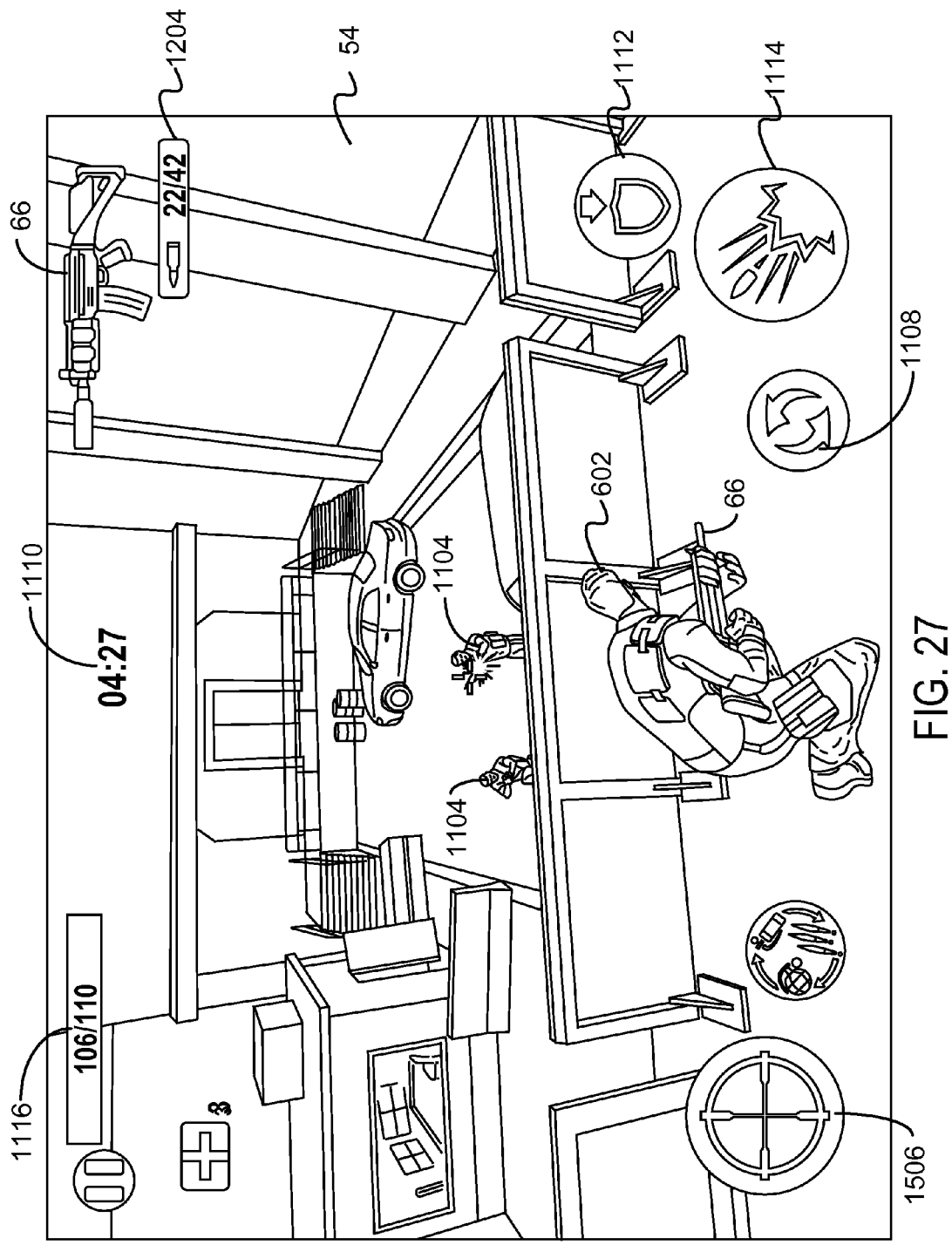
Figure 28:
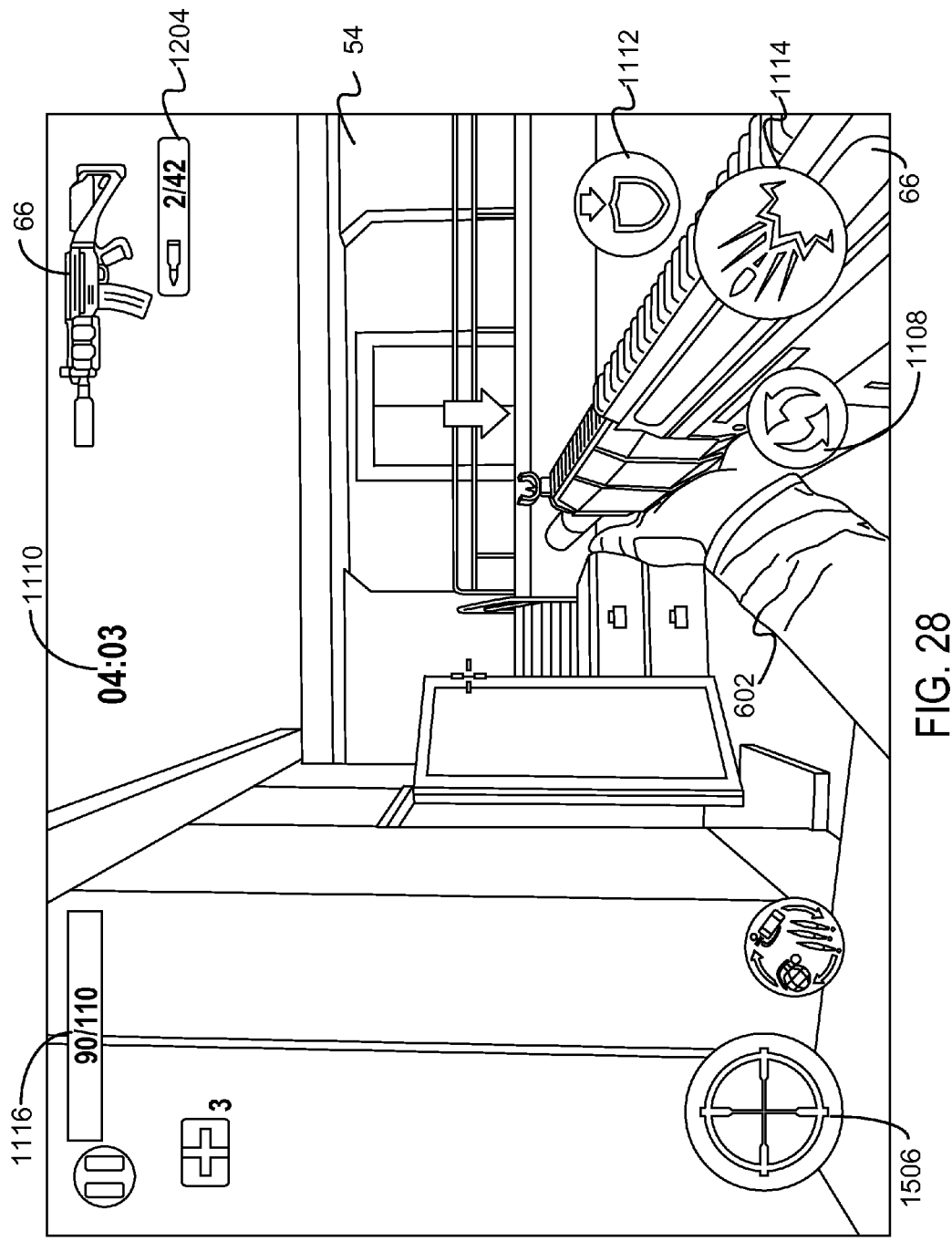
Figure 29:
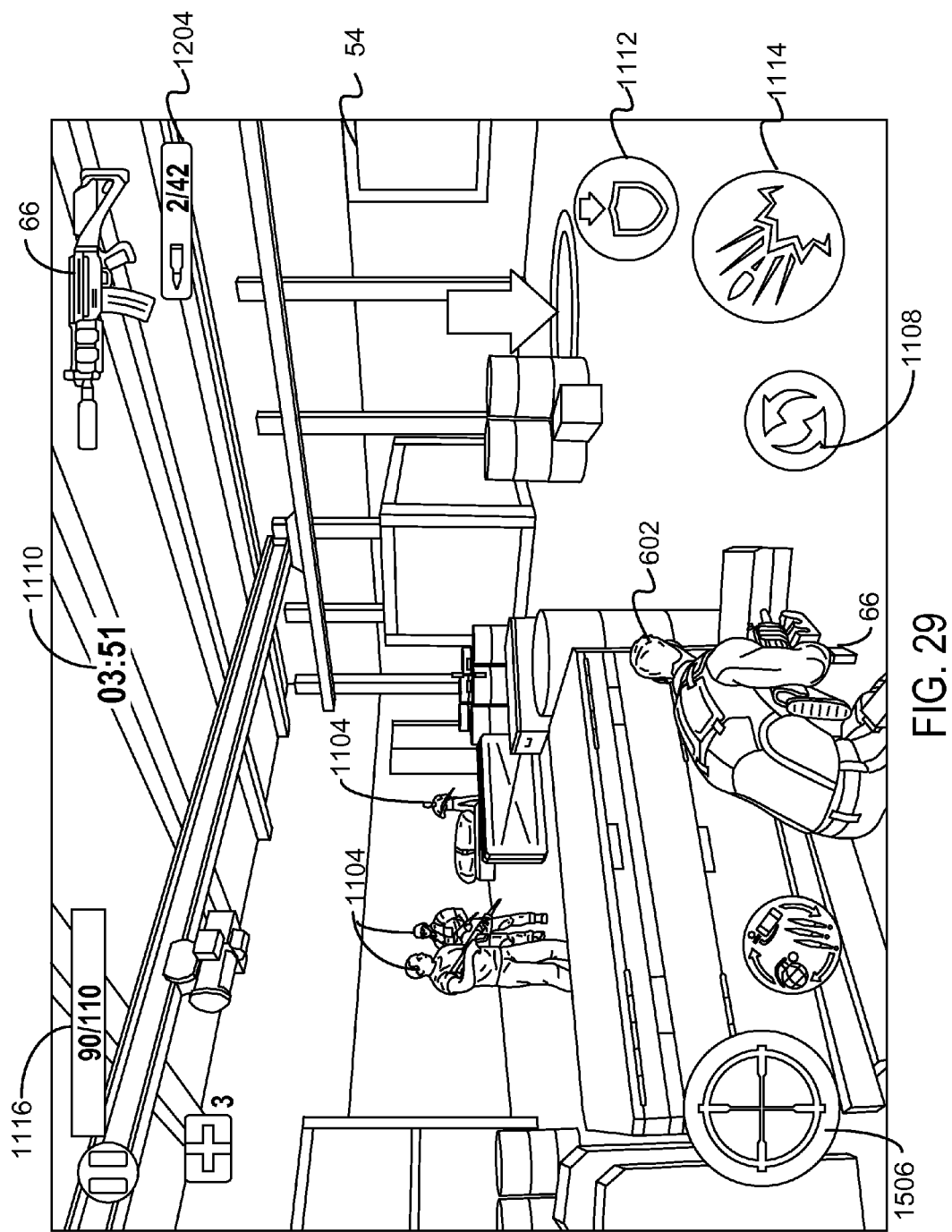
Figure 30:
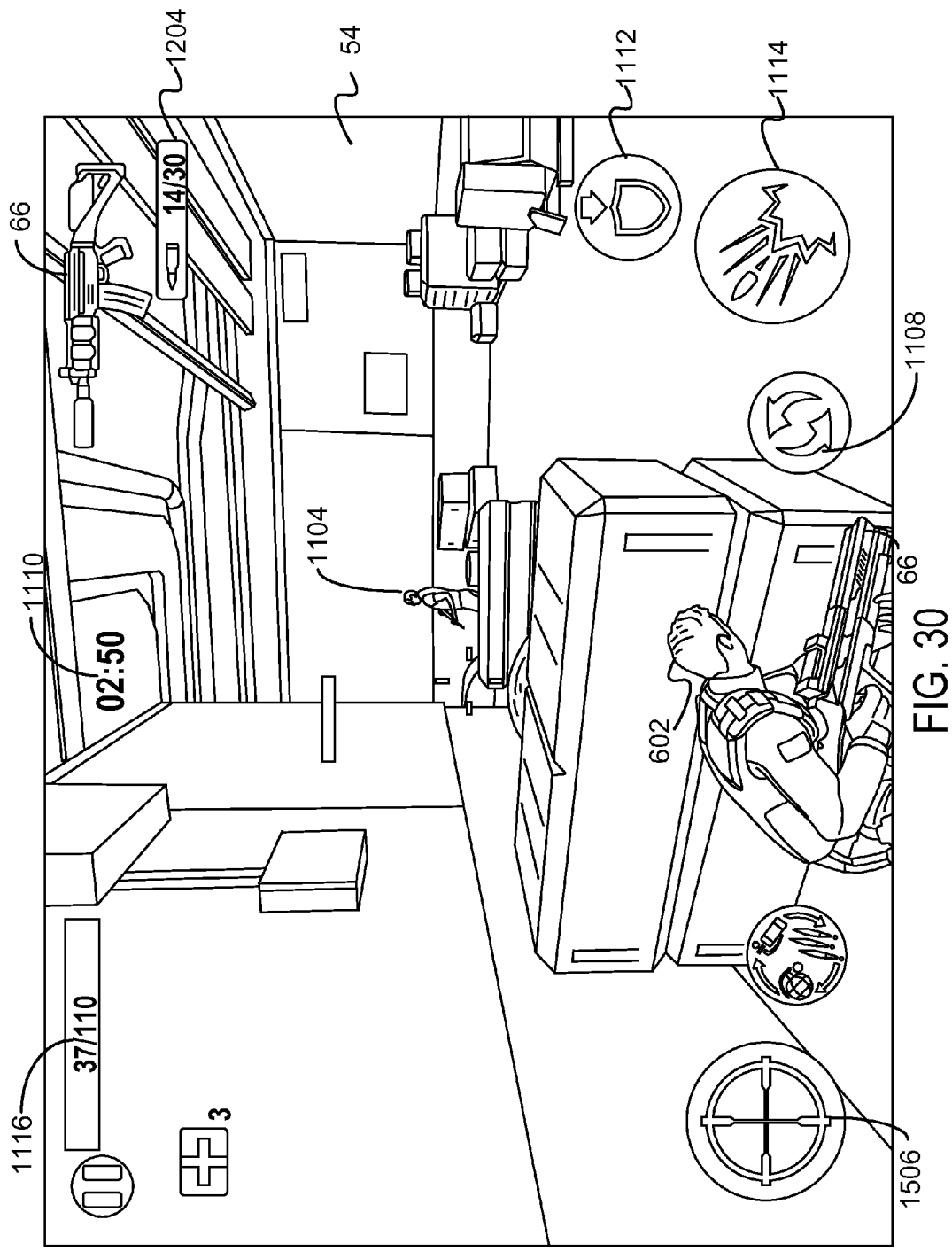

FIGS. 19 through 22 illustrate successive screen images of still another campaign 348 that illustrates how the player, posed as an avatar 602 against a plurality of defendants 1104 of a base 342 in a three dimensional action shooting format in which the avatar 602 and the plurality of defendants 1104 are adverse to each other and use weapons against each other and where the avatar 602 has an ability to use a weapon (e.g., fire a projectile, throw the weapon, swing the weapon) in three dimensions during the campaign in accordance with an embodiment of the present disclosure. FIGS. 23 through 25 are successive screen images of yet another such campaign and FIGS. 26 through 30 are successive screen images of a yet another such campaign. The Figures collectively illustrate nonlimiting examples of the variety of three-dimensional sections 54 bases 342 may have, and the variety of links between such three-dimensional sections 54. Examples of three-dimensional sections include, but are not limited to, parking lots, vehicle garages, warehouse spaces, laboratories, armories, passageways, offices, torture chambers, jail cells, missile silos, and dungeons.

Figure 5:
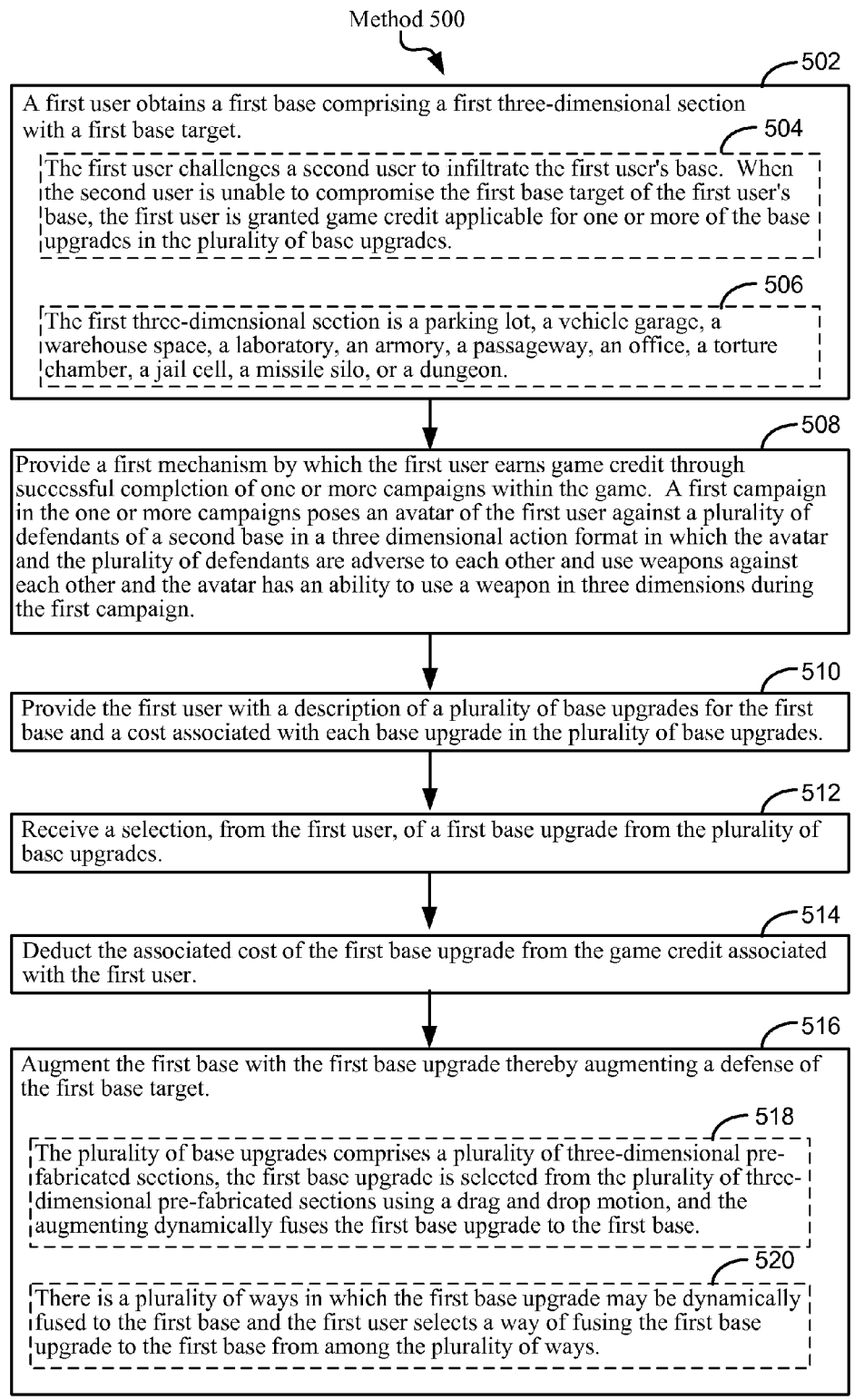
FIG. 5 is another example flow chart illustrating a method for playing a game, in accordance with some implementations of the present disclosure.

FIG. 5 is an example flow chart illustrating a method (500) in accordance with embodiments of the present disclosure. In the method a first user obtains a first base comprising a first three-dimensional section with a first base target (502). In some embodiments, the first user challenges a second user to infiltrate the first user's base. When the second user is unable to compromise the first base target of the first user's base, the first user is granted game credit applicable for one or more of the base upgrades in the plurality of base upgrades (504). In some embodiments, the first three-dimensional section is a parking lot, a vehicle garage, a warehouse space, a laboratory, an armory, a passageway, an office, a torture chamber, a jail cell, a missile silo or a dungeon (506).

The first user is granted a first mechanism by which the first user earns game credit through successful completion of one or more campaigns within the game. A first campaign in the one or more campaigns poses an avatar of the first user against a plurality of defendants of a second base in a three dimensional action shooting format in which the avatar and the plurality of defendants are adverse to each other and use weapons against each other and in which the avatar has an ability to use the weapon in three dimensions during the first campaign (508). The first user is provided with a description of a plurality of base upgrades for the first base and a cost associated with each base upgrade in the plurality of base upgrades (510).

A selection is received, from the first user, of a first base upgrade from the plurality of base upgrades (512). The associated cost of the first base upgrade is deducted from the game credit associated with the first user (514). The first base is augmented with the first base upgrade thereby augmenting a defense of the first base target (516). In some embodiments, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base (518). In some embodiments, the plurality of base upgrades comprises a plurality of three-dimensional pre-fabricated sections, the first base upgrade is selected from the plurality of three-dimensional pre-fabricated sections using a drag and drop motion using screen interface 26, and the augmenting dynamically fuses the first base upgrade to the first base (518). In some embodiments, there is a plurality of ways in which the first base upgrade may be dynamically fused to the first base and the first user selects a way of fusing the first base upgrade to the first base from among the plurality of ways (520). This is illustrated in FIG. 31, which illustrates a base 50 associated with a user. The base has five three-dimensional sections, a parking lot 54-1, a corridor 54-2, a work room 54-3, a passageway 54-4, and an office 54-5. Advantageously, in some embodiments, the user is able to arrange these sections 54 in any derived order. For example, instead of having the parking lot 54-1 to the far left, it could in fact be placed between the corridor 54-2 and the work room 54-3. Referring to FIG. 31, the base target 52-1 is located in the office 54-5. Pathways 3102 indicate the paths an infiltrator must take in order to infiltrate the base 50 and neutralize the target 52-1. In some embodiments, the target 52 is a specific character that is killed, such as a henchman.

As noted by the arrow on the paths, there are discrete points in which the infiltrator is positioned for firing of weapons 66. For example, corridor 54-2 has six places 3104 where an infiltrator can be (3104-1 through 3104-6), as the infiltrator traverses from the parking lot 54-1 through corridor 54-2, work room 54-3, passageway 54-4, and finally to office 54-5. FIG. 24 illustrates this feature from the three-dimensional perspective. The user 602 infiltrating the base is at position 1120-1. This is equivalent to a position 3104 of FIG. 31. The user may jump to position 1120-2 or position 1120-3, designated to the user by arrows within the game, in order to traverse along the path that ultimately leads to the base target. In some embodiments, the arrows 1120-2 and 1120-3 are highlighted in a first way when it is not safe to traverse to the corresponding positions associated with the arrows and are highlighted in a second way when it is safe to traverse to these positions. For example, in some embodiments, the arrows are highlighted in red when it is not safe to traverse to their associated positions, and in green when it is safe.

Referring again to FIG. 31, in some embodiments, the user associated with the base uses game credit to buy defenses for the base instead of or in addition to three-dimensional sections. In some such embodiments, the user is able to position these defenses in specific three-dimensional sections 52 of the base 50. As an example, the user may use game credit to purchase a guard for corridor 54-2. As another example, the user may use game credit to purchase improved characteristics of a guard (e.g., accuracy, number of shots required to kill, reload speed, quality of weapon, etc.) that is already been positioned in corridor 54-2. As another example, the user may use game credit to purchase other forms of defenses such as booby traps, barricades, false doors, or wild animals and position them in the base.

Figure 32:
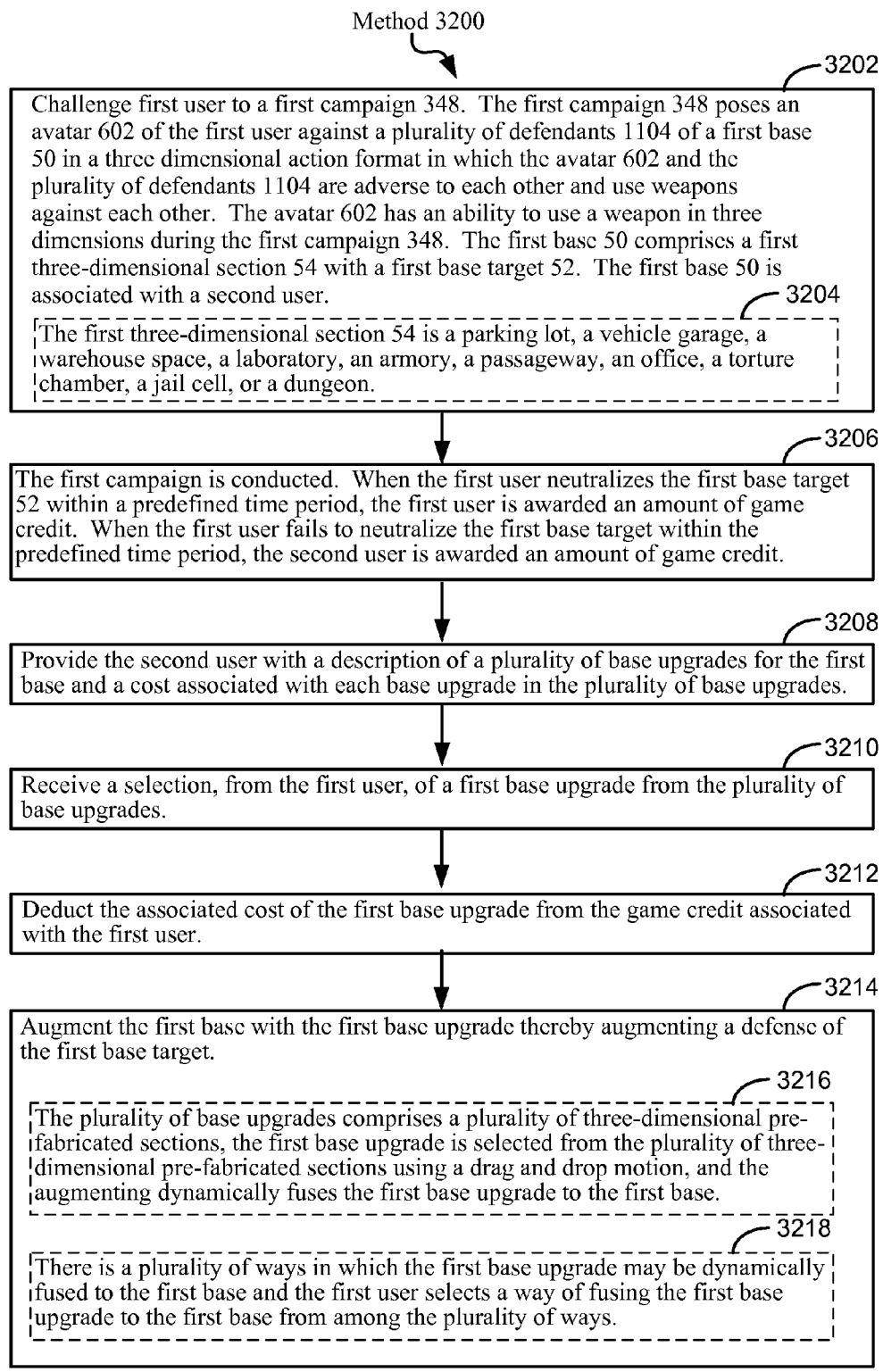
FIG. 32 illustrates another example flow chart illustrating a method for playing a game, in accordance with some implementations of the present disclosure.

FIG. 32 is an example flow chart illustrating a method (3200) in accordance with embodiments of the present disclosure. In the method a first user is challenged to a first campaign (3202). The first campaign 348 poses an avatar 602 of the first user against a plurality of defendants 1104 of a first base 50 in a three dimensional action shooting format in which the avatar 602 and the plurality of defendants 1104 are adverse to each other and use (e.g., fire, swing, throw) weapons against each other. The avatar 602 has an ability to use (e.g., fire, swing, throw) a weapon in three dimensions during the first campaign 348. The first base 50 comprises a first three-dimensional section 54 with a first base target 52. The first base 50 is associated with a second user.

In some embodiments, the first three-dimensional section 54 is a parking lot, a vehicle garage, a warehouse space, a laboratory, an armory, a passageway, an office, a torture chamber, a jail cell, a missile silo or a dungeon (3204).

A first campaign is conducted (3206). An example of such a campaign that is successfully completed is illustrated by FIGS. 11 through 14 as successive screen images, in accordance with an embodiment of the present disclosure. FIGS. 15 through 18 are successive screen images of a second campaign that is not successfully completed, in accordance with an embodiment of the present disclosure.

In some embodiments, when the first user neutralizes the first base target 52 within a predefined time period (e.g., the campaign is successfully completed), the first user is awarded an amount of game credit and, when the first user fails to neutralize the first base target within the predefined time period, the second user is awarded an amount of game credit (3206).

In some embodiments, when the first user neutralizes the first base target 52 within a predefined time period (e.g., the campaign is successfully completed), the first user is awarded a first amount of game credit and the second user is awarded a second amount of game credit, where the first amount of game credit is larger than the second amount of game credit.

In some embodiments, when the first user fails to neutralize the first base target 52 within a predefined time period (e.g., the campaign is successfully completed), the first user is awarded a first amount of game credit and the second user is awarded a second amount of game credit, where the first amount of game credit is less than the second amount of game credit.

In some embodiments, when the first user neutralizes the first base target 52 within a predefined time period (e.g., the campaign is successfully completed), the first user is awarded a first amount of game credit and the second user is awarded no game credit.

In some embodiments, when the first user fails to neutralize the first base target 52 within a predefined time period (e.g., the campaign is successfully completed), the first user is awarded no game credit and the second user is awarded game credit.

The second user is provided with a description of a plurality of base upgrades for the first base and a cost associated with each base upgrade in the plurality of base upgrades (3208).

A selection is received, from the second user, of a first base upgrade from the plurality of base upgrades (3210). The associated cost of the first base upgrade is deducted from the game credit associated with the second user (3212). The first base is augmented with the first base upgrade thereby augmenting a defense of the first base target (3214). In some embodiments, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base. In some embodiments, the plurality of base upgrades comprises a plurality of three-dimensional pre-fabricated sections, the first base upgrade is selected from the plurality of three-dimensional pre-fabricated sections using a drag and drop motion using screen interface 26 (FIG. 2), and the augmenting dynamically fuses the first base upgrade to the first base (3216). In some embodiments, there is a plurality of ways in which the first base upgrade may be dynamically fused to the first base and the first user selects a way of fusing the first base upgrade to the first base from among the plurality of ways (3218). This is illustrated in FIG. 31, which depicts a base 50 associated with a user. The base has five three-dimensional sections, a parking lot 54-1, a corridor 54-2, a work room 54-3, a passageway 54-4, and an office 54-5. Advantageously, in some embodiments, the user is able to arrange these sections 54 in any derived order. For example, instead of having the parking lot 54-1 to the far left, it could in fact be placed between the corridor 54-2 and the work room 54-3. Referring to FIG. 31, the base target 52-1 is located in the office 54-5. Pathways 3102 indicate the paths an infiltrator must take in order to infiltrate the base 50 and neutralize the target 52-1. In some embodiments, the target 52 is a specific character that is killed, such as a henchman.

Referring to FIG. 32, in some embodiments, the plurality of base upgrades comprises a plurality of three-dimensional pre-fabricated sections, the first base upgrade is selected from the plurality of three-dimensional pre-fabricated sections, and the augmenting dynamically fuses the first base upgrade to the first base. In some embodiments, there is a plurality of ways in which the first base upgrade may be dynamically fused to the first base and the second user selects a way of fusing the first base upgrade to the first base from among the plurality of ways. In some embodiments, first base upgrade is a parking lot, a vehicle garage, a warehouse space, a laboratory, an armory, a passageway, an office, a torture chamber, a jail cell, or a dungeon. In some embodiments, the first base upgrade is a room and the fusing results in a doorway between the first three-dimensional section and the room. In some embodiments, the plurality of base upgrades comprises a plurality of defenses, and the first base upgrade is selected from the plurality of defenses. In some embodiments, the selected defense comprises an armed guard, a security camera, a sentry gun, a trip wire, a razor-wire fence, an alarm system, a gun turret, a booby trap, an explosive barrel, a wild animal, a metal detector, a laser beam, or a sentry bot. In some embodiments, a base upgrade in the plurality of base upgrades comprises an upgrade in a skill level of an armed guard associated with the first base. In some embodiments the second user allows the first user or other users to repeat the campaign, thereby giving the second user an opportunity to earn sufficient game credit to select more than one base upgrade from the plurality of upgrades.

In some embodiments, the second user is associated with a first game level and the repeated play of one or more game campaigns involving the second user's bases allows the second user to advance from a first game level to progressively higher game levels. In such embodiments, a composition of the plurality of base upgrades offered to the second user is a function of the game level associated with the second user. In some embodiments, the plurality of base upgrades offered to the second user for selection are more effective at protecting the first base target when the second user is associated with a more advanced game level.

In some embodiments, the second user can also earn game credit through monetary compensation. In some embodiments, the second user is able to build a second base comprising a second three-dimensional section with a second base target in a single gaming session. In some embodiments, the second user is able to build and store a plurality of bases, where each base in the plurality of bases comprises a corresponding three-dimensional section and a corresponding base target. In some embodiments, the first base target is a henchman uniquely associated with the first base. In some embodiments, the second user earns game credit by allowing users to campaign against a base associated with the first user multiple times, thereby allowing the second user to earn sufficient game credit to select more than one base upgrade from the plurality of upgrades over time, and the plurality of base upgrades comprises a plurality of three-dimensional pre-fabricated sections, the first base upgrade is selected from the plurality of three-dimensional pre-fabricated sections, the augmenting dynamically fuses the first base upgrade to the first base and the plurality of base upgrades further comprises a plurality of defenses, and a second base upgrade selected by the first user for the first base is selected from the plurality of defenses.

In some embodiments, a base editor permits the second user to rebuild the first base from among the plurality of base upgrades, subject to the constraints of the game credit associated with the second user. In some embodiments, the plurality of base upgrades includes one or more three-dimensional pre-fabricated sections and one or more defenses. In some embodiments, the avatar is subject to termination in a campaign when shot a predetermined number of times by the plurality of defendants and, when terminated, the first user earns diminished or no credit game credit for the campaign.

In some embodiments, a campaign in the one or more campaigns requires the avatar to neutralize a second base target associated with the second base.

In some embodiments, the one or more campaigns is a plurality of campaigns, and each respective campaign in the plurality of campaigns is associated with a different base in a plurality of bases and, further, the first user is able to select from among the plurality of campaigns by the first mechanism in order to attempt to earn game credit.

Throughout this disclosure the terms profile 48 and profile 338 have been used interchangeably. While a profile 48 is found on a computing device 102 associated with a particular user and a profile 338 is found in a user profile database 336 on a gaming server 106, the present disclosure encompasses all possible variants of such a schema, including embodiments in which profile 48 does not exist or profile 338 does not exist and including embodiments in which some user information is found in profile 48 and some user information is found in profile 338. It is for this reason that the terms profile 48 and profile 338 have been used interchangeably in the present disclosure. Likewise, the terms "player" and "user" have been used interchangeably throughout the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the "first mark" are renamed consistently and all occurrences of the "second mark" are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A non-transitory computer readable storage medium for playing a video game, wherein the non-transitory computer readable storage medium is stored on a computing device, the computing device comprising one or more processors and memory storing one or more programs for execution by the one or more processors, and wherein the one or more programs singularly or collectively comprise instructions for:
   granting to a first user a first base comprising a first three-dimensional section with a first base target;
   providing a first mechanism by which the first user earns game credit through successful completion of one or more campaigns within the game, wherein
      a first campaign in the one or more campaigns poses a single avatar of the first user against a plurality of defendants of a second base in a three dimensional action format in which the single avatar and the plurality of defendants are adverse to each other and use weapons against each other within the second base,
      the single avatar has an ability to use a weapon in three dimensions within the second base during the first campaign, and
      successful completion of the first campaign occurs when the single avatar of the first user infiltrates the second base by compromising a single predetermined second base target associated with the second base;
   providing the first user with a description of a plurality of base upgrades for the first base and a cost associated with each base upgrade in the plurality of base upgrades;
   receiving a selection, from the first user, of a first base upgrade from the plurality of base upgrades;
   deducting the associated cost of the first base upgrade from the game credit associated with the first user acquired through the successful completion of one or more campaigns; and
   augmenting the first base with the first base upgrade thereby augmenting a defense of the first base target.

2. The non-transitory computer readable storage medium of claim 1, wherein the plurality of base upgrades comprises a plurality of three-dimensional pre-fabricated sections, the first base upgrade is selected by the first user from the plurality of three-dimensional pre-fabricated sections, and wherein the augmenting dynamically fuses the first base upgrade to the first base.

3. The non-transitory computer readable storage medium of claim 2, wherein there is a plurality of ways in which the first base upgrade may be dynamically fused to the first base and the first user selects a way of fusing the first base upgrade to the first base from among the plurality of ways.

4. The non-transitory computer readable storage medium of claim 2, wherein the first base upgrade is a parking lot, a vehicle garage, a warehouse space, a laboratory, an armory, a passageway, an office, a torture chamber, a jail cell, a missile silo or a dungeon.

5. The non-transitory computer readable storage medium of claim 2, wherein the first base upgrade is a room and the fusing results in a doorway between the first three-dimensional section and the room.

6. The non-transitory computer readable storage medium of claim 1, wherein the plurality of base upgrades comprises a plurality of defenses, and wherein the first base upgrade is selected from the plurality of defenses.

7. The non-transitory computer readable storage medium of claim 6, wherein the selected defense comprises an armed guard, a security camera, a sentry gun, a trip wire, a razor-wire fence, an alarm system, a gun turret, a booby trap, an explosive barrel, a wild animal, a metal detector, a laser beam, or a sentry bot.

8. The non-transitory computer readable storage medium of claim 1, wherein a base upgrade in the plurality of base upgrades comprises an upgrade in a skill level of an armed guard within the first base.

9. The non-transitory computer readable storage medium of claim 1, wherein the first mechanism by which the first user earns game credit is configured to be repeated by the user, thereby allowing the first user to earn sufficient game credit to select more than one base upgrade from the plurality of upgrades.

10. The non-transitory computer readable storage medium of claim 9, wherein the first user is associated with a first game level and wherein the first mechanism by which the first user earns the game credit is configured to advance the first user from the first game level to progressively higher game levels, and wherein a composition of the plurality of base upgrades is a function of the game level associated with the first user.

11. The non-transitory computer readable storage medium of claim 10, wherein the plurality of base upgrades offered to the first user for selection are more effective at protecting the first base target when the first user is associated with a more advanced game level.

12. The non-transitory computer readable storage medium of claim 1, wherein the one or more programs further singularly or collectively include instructions for allowing the first user to challenge a second user or the computing device to infiltrate the first user's base, wherein, when the second user or the computing device is unable to compromise the first base target of the first user's base, the first user is granted game credit applicable for one or more of the base upgrades in the plurality of base upgrades.

13. The non-transitory computer readable storage medium of claim 12, wherein the second user or computing device is deemed to have been unable to infiltrate the first user's base when the second user or the computing device is unable to compromise the first base target of the first user's base prior to being terminated.

14. The non-transitory computer readable storage medium of claim 12, wherein the second user or computing device is deemed to have been unable to infiltrate the first user's base when the second user or the computing device is unable to compromise the first base target of the first user's base before a predetermined amount of time has elapsed.

15. The non-transitory computer readable storage medium of claim 1, wherein the one or more programs further singularly or collectively include instructions for providing a second mechanism by which the first user earns game credit through monetary compensation.

16. The non-transitory computer readable storage medium of claim 1, wherein the one or more programs further singularly or collectively include instructions for allowing the first user to build a second base comprising a second three-dimensional section with a second base target in a single gaming session.

17. The non-transitory computer readable storage medium of claim 1, wherein the one or more programs further singularly or collectively include instructions for allowing the first user to build and store a plurality of bases, wherein each base in the plurality of bases comprises a corresponding three-dimensional section and a corresponding base target.

18. The non-transitory computer readable storage medium of claim 1, wherein the first base target is a henchman within the first base.

19. The non-transitory computer readable storage medium of claim 1, wherein the first mechanism by which the first user earns game credit is configured to be repeated by the user, thereby allowing the first user to earn sufficient game credit to select more than one base upgrade from the plurality of upgrades over time, and wherein
the plurality of base upgrades comprises a plurality of three-dimensional pre-fabricated sections, the first base upgrade is selected from the plurality of three-dimensional pre-fabricated sections, and wherein the augmenting dynamically fuses the first base upgrade to the first base; and
the plurality of base upgrades further comprises a plurality of defenses, and wherein a second base upgrade selected by the first user for the first base is selected from the plurality of defenses.

20. The non-transitory computer readable storage medium of claim 1, wherein the one or more programs further singularly or collectively include instructions for providing a base editor that permits the first user to rebuild the first base from among the plurality of base upgrades, subject to the constraints of the game credit associated with the first user.

21. The non-transitory computer readable storage medium of claim 20, wherein the plurality of base upgrades includes one or more three-dimensional pre-fabricated sections and one or more defenses.

22. The non-transitory computer readable storage medium of claim 1, wherein the single avatar is subject to termination in a campaign when shot a predetermined number of times by the plurality of defendants and wherein, when terminated, the first user does not earn game credit for the campaign.

23. The non-transitory computer readable storage medium of claim 1, wherein a campaign in the one or more campaigns requires the single avatar to neutralize a second base target associated with the second base.

24. The non-transitory computer readable storage medium of claim 1, wherein the one or more campaigns is a plurality of campaigns, each respective campaign in the plurality of campaigns being associated with a different base in a plurality of bases and wherein the first user is able to select from among the plurality of campaigns by the first mechanism in order to attempt to earn game credit.

25. A computing system for playing a video game, the computing system comprising one or more processors and memory storing one or more programs for execution by the one or more processors, the one or more programs singularly or collectively executing a method comprising:
granting to a first user a first base comprising a first three-dimensional section with a first base target;
providing a first mechanism by which the first user earns game credit through successful completion of one or more campaigns within the game, wherein
a first campaign in the one or more campaigns poses a single avatar of the first user against a plurality of defendants of a second base in a three dimensional action shooting format in which the single avatar and the plurality of defendants are adverse to each other and use weapons against each other within the second base,
the single avatar has an ability to use a weapon in three dimensions within the second base during the first campaign, and
successful completion of the first campaign occurs when the single avatar of the first user infiltrates the second base by compromising a single predetermined second base target associated with the second base;
providing the first user with a description of a plurality of base upgrades for the first base and a cost associated with each base upgrade in the plurality of base upgrades;
receiving a selection, from the first user, of a first base upgrade from the plurality of base upgrades;
deducting the associated cost of the first base upgrade from the game credit associated with the first user acquired through the successful completion of one or more campaigns; and
augmenting the first base with the first base upgrade thereby augmenting a defense of the first base target.

26. The computing system of claim 25, wherein the computing system is a server and the first user interacts with the video game using a first client device that remotely interacts with the server.

27. The computing system of claim 25, wherein the one or more programs further singularly or collectively include instructions for allowing the first user to challenge a second user or the computing system to infiltrate the first user's base, wherein, when the second user or the computing system is unable to compromise the first base target of the first user's base, the first user is granted game credit applicable for one or more of the base upgrades in the plurality of base upgrades.

28. The computing system of claim 25, wherein the computing system is a server, the first user interacts with the video game using a first client device that remotely interacts with the server, and the second user interacts with the video game using a second client device that remotely interacts with the server.

29. The computing system of claim 28, wherein the first mechanism by which the first user earns game credit is configured to be repeated by the user, thereby allowing the first user to earn sufficient game credit to select more than one base upgrade from the plurality of upgrades over time, and wherein the plurality of base upgrades comprises a plurality of three-dimensional pre-fabricated sections, the first base upgrade is selected from the plurality of three-dimensional pre-fabricated sections, and wherein the augmenting dynamically fuses the first base upgrade to the first base; and the plurality of base upgrades further comprises a plurality of defenses, and wherein a second base upgrade selected by the first user for the first base is selected from the plurality of defenses.

30. A non-transitory computer readable storage medium for playing a game, wherein the non-transitory computer readable storage medium is stored on a computing device, the computing device comprising one or more processors and memory storing one or more programs for execution by the one or more processors, and wherein the one or more programs singularly or collectively comprise instructions for:

challenging a first user to a first campaign, wherein the first campaign poses a single avatar of the first user against a plurality of defendants of a first base in a three dimensional action format in which the avatar and the plurality of defendants are adverse to each other and use weapons against each other within the first base, the single avatar has an ability to use a weapon in three dimensions within the first base during the first campaign, the first base comprises a first three-dimensional section comprising a single base target, and the first base is associated with a second user;

conducting the first campaign, wherein when the first user neutralizes the single base target within a predefined time period, the first user is awarded game credit;

when the first user fails to neutralize the single base target within the predefined time period, the second user is awarded game credit;

providing the second user with a description of a plurality of base upgrades for the first base and a cost associated with each base upgrade in the plurality of base upgrades;

receiving a selection, from the second user, of a first base upgrade from the plurality of base upgrades;

deducting the associated cost of the first base upgrade from the game credit associated with the second user; and augmenting the first base with the first base upgrade thereby augmenting a defense of the first base target.

* * * * *